(12) United States Patent
Tan et al.

(10) Patent No.: US 12,271,500 B2
(45) Date of Patent: Apr. 8, 2025

(54) METHOD AND SYSTEM FOR DETERMINING AN ORDER OF ENCRYPTED INPUTS

(71) Applicant: Agency for Science, Technology and Research, Singapore (SG)

(72) Inventors: Hong Meng Benjamin Tan, Singapore (SG); Khin Mi Mi Aung, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 371 days.

(21) Appl. No.: 17/428,884

(22) PCT Filed: Feb. 13, 2020

(86) PCT No.: PCT/SG2020/050073
§ 371 (c)(1),
(2) Date: Aug. 5, 2021

(87) PCT Pub. No.: WO2020/167254
PCT Pub. Date: Aug. 20, 2020

(65) Prior Publication Data
US 2022/0100889 A1    Mar. 31, 2022

(30) Foreign Application Priority Data
Feb. 13, 2019    (SG) .......................... 10201901244X

(51) Int. Cl.
*G06F 21/62*    (2013.01)
*G06F 21/60*    (2013.01)
(Continued)

(52) U.S. Cl.
CPC ........ *G06F 21/6227* (2013.01); *G06F 21/602* (2013.01); *G06F 21/78* (2013.01); *H04L 9/008* (2013.01)

(58) Field of Classification Search
CPC .... G06F 21/6227; G06F 21/602; G06F 21/78; H04L 9/008
(Continued)

(56) References Cited

U.S. PATENT DOCUMENTS 7,092,522 B1 * 8/2006 Futa .................. G06F 17/12
380/28
9,608,817 B2 * 3/2017 Gentry .................. H04L 9/38
(Continued)

FOREIGN PATENT DOCUMENTS

CN    107317666 A    11/2017
CN    108830284 A * 11/2018 ........... G06F 21/602

OTHER PUBLICATIONS

Mihai et al, Comparison-based computations over fully homomorphic encrypted data, 2014, 10th International Conference on Communications (COMM) (Year: 2014).*
(Continued)

*Primary Examiner* — Brandon Hoffman
(74) *Attorney, Agent, or Firm* — Shackelford, McKinley & Norton, LLP

(57) ABSTRACT

There is provided a method of determining an order of encrypted inputs, including a first encrypted input and a second encrypted input, using at least one processor, the first encrypted input including a first encrypted data and the second encrypted input including a second encrypted data, each of the first and second encrypted data being encrypted based on a homomorphic encryption scheme, the method including: generating a first series of encrypted blocks from the first encrypted data and a second series of encrypted blocks from the second encrypted data; performing a first block-wise operation between the first series of encrypted blocks and the second series of encrypted blocks to obtain a first series of block-wise outputs; performing a second block-wise operation between the first series of encrypted
(Continued)

blocks and the second series of encrypted blocks to obtain a second series of block-wise outputs; and determining an order of the first and second encrypted data based on the first series of block-wise outputs and the second series of block-wise outputs. There is also provided a corresponding system for determining an order of encrypted inputs.

18 Claims, 11 Drawing Sheets

(51) Int. Cl.
*G06F 21/78* (2013.01)
*H04L 9/00* (2022.01)

(58) Field of Classification Search
USPC .......................................................... 726/26
See application file for complete search history.

(56) References Cited

U.S. PATENT DOCUMENTS

| | | | |
|---|---|---|---|
| 9,900,147 | B2 | 2/2018 | Laine et al. |
| 2016/0020898 | A1 | 1/2016 | Nikolaenko et al. |
| 2016/0072801 | A1* | 3/2016 | Cao ....................... H04L 9/0866 713/186 |
| 2017/0180115 | A1 | 6/2017 | Laine et al. |
| 2017/0293913 | A1 | 10/2017 | Gulak et al. |

OTHER PUBLICATIONS

Agrawal et al., "Order Preserving Encryption for Numeric Data," Proceedings of the ACM SIGMOD International Conference on Management of Data, Paris France, Jun. 13-18, 2004, pp. 563-574.
Martin R. Albrecht, "On Dual Lattice Attacks Against Small-Secret LWE and Parameter Choices in HElib and Seal," Eurocrypt, Part II, vol. 10211 of LNCS, Springer, Heidelberg, 2017, pp. 103-129.
Albrecht et al., "On the Concrete Hardness of Learning with Errors," Journal of Mathematical Cryptology, vol. 9, No. 3, 2015, pp. 1-42.
Boldyreva et al., "Order-Preserving Symmetric Encryption," Advances in Cryptology—EUROCRYPT 2009, 28th Annual International Cryptology Conference, vol. 5479 of LNCS, Springer, Heidelberg, Apr. 2009, pp. 224-241.
Boldyreva et al., "Order-Preserving Encryption Revisited: Improved Security Analysis and Alternative Solutions," Advances in Cryptology—CRYPTO 2011, 31st Annual International Cryptology Conference, vol. 6841 of LNCS, Springer, Heidelberg, Aug. 2011, pp. 578-595.
Boneh et al., "Private Database Queries Using Somewhat Homomorphic Encryption," ACNS 13, vol. 7954 of NCS, Springer, Heidelberg, Jun. 2013, pp. 102-118.
Zvika Brakerski, "Fully Homomorphic Encryption without Modulus Switching from Classical GapSVP," CRYPTO 2012, vol. 7417 of LNCS, Springer, Heidelberg, Aug. 2012, pp. 868-886.
Brakerski et al., "(Leveled) Fully Homomorphic Encryption without Bootstrapping," ITCS 2012, ACM, 2012, pp. 309-325.
Cash et al., "Reducing the Leakage in Practical Order-Revealing Encryption," Cryptology ePrint Archive, Report 2016/661, 2016, pp. 1-12.
Chenette et al., "Practical Order-Revealing Encryption with Limited Leakage," FSE 2016, vol. 9783 of LNCS, Springer, Heidelberg, Mar. 2016, pp. 474-493.
Cheon et al., "Optmiized Search-and-Compute Circuits and Their Application to Query Evaluation on Encrypted Data," IEEE Transactions on Information Forensics and Security, vol. 11, No. 1, Jan. 2016, pp. 188-199.
Damgard et al., "Homorphic Encryption and Secure Comparison," International Journal of Applied Cryptography, vol. 1, No. 1, 2008, pp. 22-31.
Durak et al., "What Else is Revealed by Order-Revealing Encryption?" ACM CCS 16, Oct. 2016, pp. 1155-1166.
Egorov et al., "ZeroDB White Paper," arXiv:1602.071683v3, Mar. 8, 2016, pp. 1-11.
Fan et al., "Somewhat Practical Fully Homomorphic Encryption," Cryptology ePrint Archive, Report 2012/144, 2012, pp. 1-19.
Gentry et al., "Private Database Access with HE-over-ORAM Architecture," ACNS 15, vol. 9092 of LNCS, Spring, Heidelberg, Jun. 2015, pp. 172-191.
Gentry et al., "Fully Homomorphic Encryption with Polylog Overhead," EUROCRYPT 2012, vol. 7237 of LNCS, Springer, Heidelberg, 2012, pp. 465-482.
Grubbs et al., "Leakage-Abuse Attacks Against Order-Revealing Encryption," IEEE Symposium on Security and Privacy, IEEE Computer Society Press, May 2017, pp. 655-672.
Halevi et al., "Algorithms in HElib," CRYPTO 2014, Part I, vol. 8616 of LNCS, Springer, Heidelberg, 2014, pp. 554-571.
Halevi et al., "Bootstrapping for HElib," EUROCRYPT 2015, Par I, vol. 9056 of LNCS, Springer, Heidelberg, 2015, pp. 641-670.
Florian Kerschbaum, "Frequency-Hiding Order-Preserving Encryption," ACM CCS 15, ACM Press, Oct. 2015, pp. 656-667.
Kim et al., "Better Security for Queries on Encrypted Databases," Cryptology ePrint Archive, Report 2016/470, 2016, pp. 1-22.
Kim et al., "On the Efficiency of FHE-Based Private Queries," IEEE Transactions on Dependable and Secure Computing, vol. 15, No. 2, Mar./Apr. 2018, pp. 357-363.
Lewi et al., "Order-Revealing Encryption: New Constructions, Applications, and Lower Bounds," ACM CCS 16, ACM Press, Oct. 2016, pp. 1167-1178.
Naveed et al., "Inference Attacks on Property-Preserving Encrypted Databases," ACM CCS 15, ACM Press, Oct. 2015, pp. 644-655.
Poddar et al., "ARX: A Strongly Encrypted Database System," Cryptology ePrint Archive, Report 2016/591, 2016, pp. 1-20.
Popa et al., "CryptDB: Protecting Confidentiality with Encrypted Query Processing," ACM Symposium on Operating Systems Principles (SOSP) 2011, ACM, 2011, pp. 85-100.
S. Roman, "Filed Theory," Springer 2005, pp. 236-237.
Smart et al., "Fully Homomorphic SIMD Operations," Cryptology ePrint Archive, Report 2011/133, 2011, pp. 1-19.
Malkin et al., "Order-Preserving Encryption Secure Beyond One-Wayness," ASIACRYPT 2014, Part II, vol. 8874 of LNCS, Springer, Heidelberg, Dec. 2014, pp. 42-61.
Basilakis et al., "Efficient Parallel Binary Operations on Homomorphic Encrypted Real Numbers," IACR Cryptology ePrint Archive, 2018, pp. 1-27.
Togan et al., "Comparison-Based Applications for Fully Homomorphic Encrypted Data," Proceedings of the Romanian Academy, Series A, vol. 16, Special Issue 2015, pp. 329-338.
Tu et al., "Processing Analytical Queries Over Encrypted Data," Proceedings of the VLDB Endowment, vol. 6, No. 5, 2013, pp. 1-12.
Roche et al., "POPE: Partial Order Preserving Encoding," CCS '16: Proceedings of the 2016 ACM SIGSAC Conference on Computer and Communications Security, Oct. 2016, pp. 1131-1142.
Popa et al., "An Ideal-Security Protocol for Order-Preserving Encoding," 2013 IEEE Symposium on Security and Privacy, 2013, pp. 1-20.
Kamara et al., "SQL on Structurally-Encrypted Databases," 2016, pp. 1-58.
Chatterjee et al., "Accelerating Sorting of Fully Homomorphic Encrypted Data," INDOCRYPT 2013, vol. 8250 of LNCS, 2013, pp. 262-273.
Bun et al., "Order-Revealing Encryption and the Hardness of Private Learning," arXiv:1505.00388, 2016, pp. 1-30.
Boneh et al., "Semantically Secure Order-Revealing Encryption: Multi-Input Functional Encryption Without Obfuscation," EUROCRYPT 2015, Part II, 2015, pp. 1-34.
Amazon, "Amazon Relational Database Services (RDS)," 2021, pp. 1-13.
International Search Report for International Application No. PCT/SG2020/050073 dated Jun. 12, 2020, pp. 1-4.

(56) References Cited

OTHER PUBLICATIONS

Written Opinion of the International Searching Authority for International Application No. PCT/SG2020/050073 dated Jun. 12, 2020, pp. 1-6.
Rhys A. Carlton, "Secure Integer Comparisons Using the Homomorphic Properties of Prime Power Subgroups,"Electronic Thesis and Dissertation Repository, Western Graduate & Postdoctoral Studies, 2017, pp. 1-69.
Cheon et al., "Search-and-Compute on Encrypted Data," International Conference on Financial Cryptography and Data Security, Sep. 5, 2015, pp. 1-27.
Cheon et al., "Homomorphic Computation of Edit Distance," International Conference on Financial Cryptography and Data Security, Sep. 5, 2015, pp. 1-16.
Tan et al., "Efficient Private Comparison Queries over Encrypted Databases using Fully Homomorphic Encryption with Finite Fields," https://eprint.iacr.org/2019/332.pdf, Mar. 27, 2019, pp. 1-20.

* cited by examiner

METHOD AND SYSTEM FOR DETERMINING AN ORDER OF ENCRYPTED INPUTS

CROSS-REFERENCE TO RELATED APPLICATION

This application claims the benefit of priority of Singapore Patent Application No. 10201901244X, filed on 13 Feb. 2019, the content of which being hereby incorporated by reference in its entirety for all purposes.

TECHNICAL FIELD

The present invention generally relates to a method of determining an order of encrypted inputs, and a system thereof.

BACKGROUND

Determining the order of two inputs is a fundamental operation, on top of which more complex tasks or algorithms, such as but not limited to, sorting and computing the minimum and maximum in a set of data may be performed. This order determining operation is natural and easy to perform on unencrypted data (e.g., unencrypted integers), such as with Boolean circuits, but becomes non-trivial on encrypted inputs. By way of an example only and without limitation, an important real-world application of determining an order of multiple inputs (or comparison on multiple inputs) is in secure database outsourcing, where organizations may store their database in the cloud and the security of the encryption scheme on the database prevents malicious parties from stealing information from the encrypted database. In these cases, it may be useful and very important to process large amounts of encrypted data simultaneously. In this regard, fully homomorphic encryption (FHE), which is an encryption scheme that can support evaluation of arbitrary circuits over encrypted data, may be employed for enabling computations to be performed on encrypted data. By way of example only and without limitations, popular or efficient FHE schemes may include the Brakerski-Gentry-Vaikuntanathan (BGV) and Brakerski-Fan-Vercauteren (BFV) schemes, which have plaintext spaces that are vectors whose entries are elements of some finite fields $\mathbb{F}_{2^{\ell}}$. However, it is still a relatively new technology and there still remain questions as to what is the best way to encode data for homomorphic computation.

Much work have been previously done to address problems associated with performing comparisons on encrypted data with varying success and they may fall into one of two categories: order-preserving (OPE) or revealing (ORE) encryption and homomorphic encryption (HE). A brief overview of schemes or techniques under these two categories will now be described below.

In the first category, comparisons are fast and ciphertexts are only a small constant multiple larger than plaintexts. However, there are drawbacks in the security of the encrypted data when such schemes are used, for example, information about underlying plaintexts are leaked. These may be several bits of the data or the result of comparisons between encrypted inputs. Some of these schemes have been shown to be vulnerable to inference attacks, when databases are encrypted with them, due to these leakages.

In the second category, there may be two different types of HE schemes, partially homomorphic encryption (PHE) and FHE. Unlike schemes in the first category, PHE-based techniques do not leak any information but rely on several rounds of communication between client and server to retrieve desired data. This does not scale well with database size since larger databases would require more and more communications to obtain answers to database queries. On the other hand, FHE, which is capable of evaluating arbitrary circuits on encrypted data, may be suited for this task. For example, the performance of computing comparisons on encrypted integers with Boolean circuits has been previously evaluated using single-instruction-multiple-data (SIMD) techniques for enhancing the performance. Sum and count queries were also considered and a lazy carry technique was proposed which traded comparison performance for fast numeric operations. Though only requiring seconds to complete, it only processes about tens of plaintexts at a time.

For example, FHE ciphertexts are very large (e.g., greater than 1000 times) compared to plaintexts, which affects the scalability and efficiency of homomorphic computations. Conventionally, an approach based on coefficient encoding may be employed, which encodes integers as constant terms of a polynomial. However, such an approach only supports small integer data (e.g., less than 32 bits). Furthermore, efficient order comparisons cannot be performed with this encoding technique as it requires $O(2^n)$ homomorphic operations, where n is the bit-size of the data.

Another approach may be based on packed bits in FHE, which packs a large number of encrypted bits into a single ciphertext. However, while order comparisons require only $O(\log n)$ homomorphic operations, the packing efficiency of such an approach is heavily dependent on the bit-size of data. With 64-bit data, for example, if k bits can be packed into a single ciphertext, then at most only k/64 integers can be packed into the single ciphertext. However, it may be desirable to pack k integers in a single ciphertext without losing too much performance.

A need therefore exists to provide a method of determining an order of encrypted inputs, and a system thereof, that seek to overcome, or at least ameliorate, one or more of the deficiencies in conventional methods/systems, such as but not limited to, improving efficiency and effectiveness. It is against this background that the present invention has been developed.

SUMMARY

According to a first aspect of the present invention, there is provided a method of determining an order of encrypted inputs, including a first encrypted input and a second encrypted input, using at least one processor, the first encrypted input including a first encrypted data and the second encrypted input including a second encrypted data, each of the first and second encrypted data being encrypted based on a homomorphic encryption scheme, the method comprising:

generating a first series of encrypted blocks from the first encrypted data and a second series of encrypted blocks from the second encrypted data;

performing a first block-wise operation between the first series of encrypted blocks and the second series of encrypted blocks to obtain a first series of block-wise outputs;

performing a second block-wise operation between the first series of encrypted blocks and the second series of encrypted blocks to obtain a second series of block-wise outputs; and determining an order of the first and second encrypted data based on the first series of block-wise outputs and the second series of block-wise outputs.

According to a second aspect of the present invention, there is provided a system for determining an order of encrypted inputs, including a first encrypted input and a second encrypted input, the first encrypted input including a first encrypted data and the second encrypted input including a second encrypted data, each of the first and second encrypted data being encrypted based on a homomorphic encryption scheme, the system comprising:

a memory; and at least one processor communicatively coupled to the memory and configured to:
generating a first series of encrypted blocks from the first encrypted data and a second series of encrypted blocks from the second encrypted data;
perform a first block-wise operation between the first series of encrypted blocks and the second series of encrypted blocks to obtain a first series of block-wise outputs;
perform a second block-wise operation between the first series of encrypted blocks and the second series of encrypted blocks to obtain a second series of block-wise outputs; and
determine an order of the first and second encrypted data based on the first series of block-wise outputs and the second series of block-wise outputs.

According to a third aspect of the present invention, there is provided a computer program product, embodied in one or more non-transitory computer-readable storage mediums, comprising instructions executable by at least one processor to perform a method of determining an order of encrypted inputs, including a first encrypted input and a second encrypted input, the first encrypted input including a first encrypted data and the second encrypted input including a second encrypted data, each of the first and second encrypted data being encrypted based on a homomorphic encryption scheme, the method comprising:

generating a first series of encrypted blocks from the first encrypted data and a second series of encrypted blocks from the second encrypted data;
performing a first block-wise operation between the first series of encrypted blocks and the second series of encrypted blocks to obtain a first series of block-wise outputs;
performing a second block-wise operation between the first series of encrypted blocks and the second series of encrypted blocks to obtain a second series of block-wise outputs; and
determining an order of the first and second encrypted data based on the first series of block-wise outputs and the second series of block-wise outputs.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

Various embodiments of the present invention provide a method of determining an order of encrypted inputs, and a system thereof. Each of the encrypted inputs comprises an encrypted data.

In computing, determining an order of inputs (each input comprising data) is an operation that has a wide variety of practical applications, such as but not limited to, sorting a set of data, determining the minimum and maximum in a set of data, and query evaluation on data, for example, stored in a database (e.g., comparing a query input with stored data). As mentioned in the background, such an order determining operation is natural and easy to perform on unencrypted data, such as with Boolean circuits, but becomes non-trivial on encrypted inputs (each encrypted input comprising encrypted data). For example, there are trade-offs between computation complexity, ciphertext size and packing efficiency that stem from how integers are encoded and encrypted when designing or developing order determining operations on encrypted data. For example, it was found according to various embodiments of the present invention that encoding the data as integers would result in a highly inefficient order determining operation, while using a vector of bits significantly reduces the amount of data that can be packed in a single ciphertext.

Accordingly, various embodiments of the present invention provide a method of determining an order of encrypted inputs, and a system thereof, that seek to overcome, or at least ameliorate, one or more of the deficiencies in conventional methods/systems, such as but not limited to, improving efficiency and effectiveness.

Figure 1:
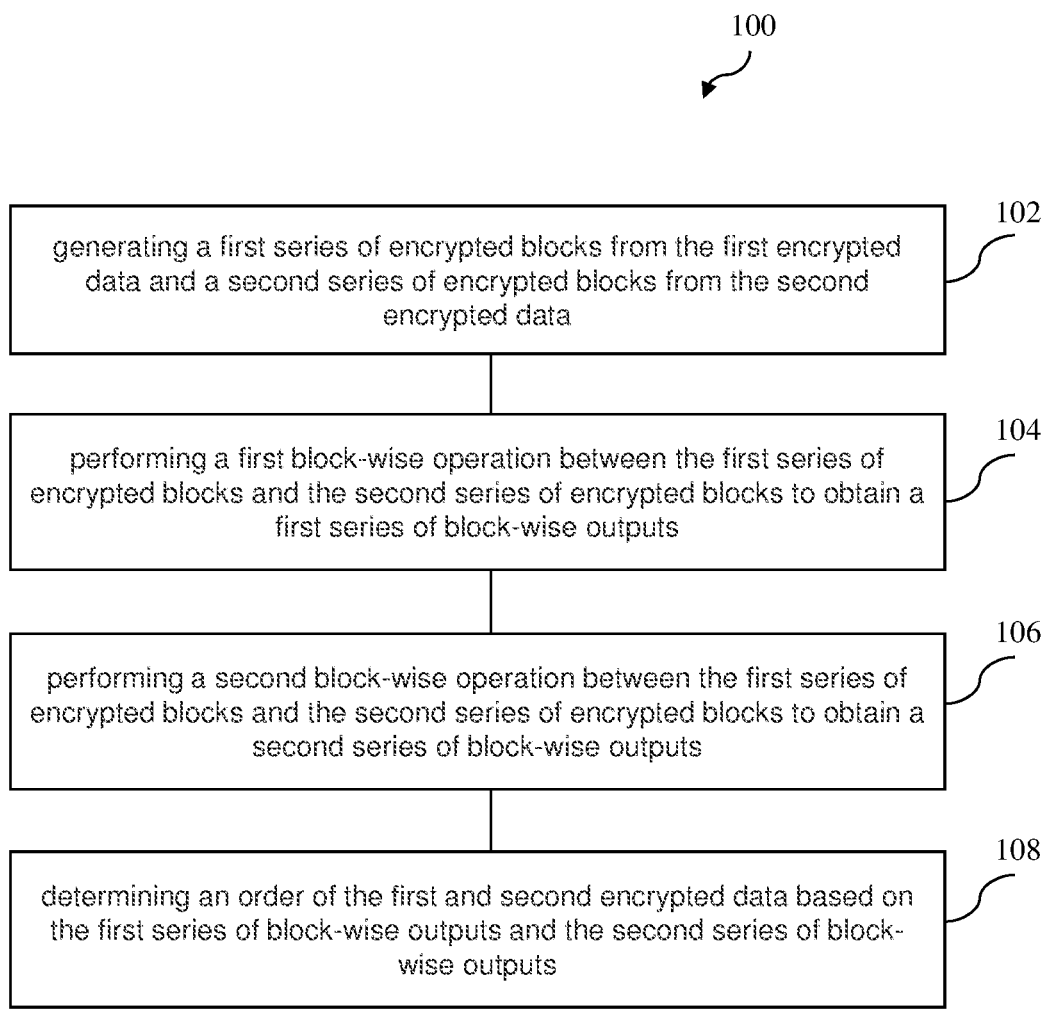
FIG. 1 depicts a schematic flow diagram of a method of determining an order of encrypted inputs, according to various embodiments of the present invention.

FIG. 1 depicts a schematic flow diagram of a method 100 of determining an order of encrypted inputs, including a first encrypted input and a second encrypted input, using at least one processor, the first encrypted input including a first encrypted data and the second encrypted input including a second encrypted data, each of the first and second encrypted data being encrypted based on a homomorphic encryption scheme, according to various embodiments of the present invention. The method 100 comprises: generating (at 102) a first series of encrypted blocks from the first encrypted data and a second series of encrypted blocks from the second encrypted data; performing (at 104) a first block-wise operation between the first series of encrypted blocks and the second series of encrypted blocks to obtain a first series of block-wise outputs (data outputs); performing (at 106) a second block-wise operation between the first series of encrypted blocks and the second series of encrypted blocks to obtain a second series of block-wise outputs (data outputs); and determining (at 108) an order of the first and second encrypted data based on the first series of block-wise outputs and the second series of block-wise outputs.

In various embodiments, the method of determining an order of encrypted inputs comprises determining an order of or between two encrypted inputs, such as between the first encrypted input and the second encrypted input.

In various embodiments, the first encrypted data and the second encrypted data may be or correspond to any type of data, such as but not limited to, a number (e.g., an integer), a character or a string. For example, an integer may be encoded (or represented) using an appropriate integer encoding scheme known in the art into an appropriate integer data representation, such as a p-ary string, where p is 2 or more (e.g., an unsigned binary pattern for an unsigned integer or a signed binary pattern (e.g., sign-magnitude representation) for a signed integer). Similarly, a character may be encoded (or represented) using an appropriate character encoding scheme known in the art into an appropriate character data representation (e.g., an ASCII representation). Accordingly, it will be appreciated by a person skilled in the art that the first encrypted data and the second encrypted data are not limited to any particular type of data or data representation of that data. By way of examples only and without limitations, a number '10' may be represented as a binary string '1010', a ternary string '101' or a 5-ary string '20', and so on. Accordingly, in various embodiments, an integer may be transformed to a p-ary string as a data representation of the integer. In various embodiments, a character may be encoded as an integer, such as based on ASCII or UTF-8, and then encoded into a p-ary string as a data representation of the character. In various embodiments, a string may be converted character-wise into corresponding integers, and then the integers may be combined into a larger integer and encoded into a p-ary string as a data representation of the string. In various example embodiments, as will be described later below, such a p-ary string as a data representation may then be encoded into a polynomial (e.g., which is a form of a field element). By way of examples only and without limitations, a binary string '1010' may be encoded into $x^3+0x^2+x+0$, a ternary strong '101' may be encoded into $x^2+0x+1$, and a 5-ary string '20' may be encoded into $2x+0$. In various embodiments, the polynomial (e.g., a field element) may then be encrypted according to homomorphic encryption scheme.

In various embodiments, amongst the encrypted inputs, the order of encrypted inputs is based on values of the encrypted inputs (values of the encrypted data in the encrypted inputs) which may be with respect to the values of the corresponding data representations of the encrypted data in the encrypted inputs or the corresponding polynomials encoded from such data representations. In various embodiments, as the encrypted data are encrypted based on a homomorphic encryption scheme, the order of the original data (e.g., between two original data) do not change after being encrypted. For example, amongst two encrypted inputs including a first encrypted input and a second encrypted input, the order of the two encrypted inputs may be that the first encrypted input is smaller (or less) than, equal to or larger (or greater) than the second encrypted input in value, or vice versa. For example, the order of the encrypted inputs may be in an ascending order or a descending order.

In various embodiments, the homomorphic encryption scheme may be a somewhat homomorphic encryption scheme, a leveled fully homomorphic encryption scheme or a fully homomorphic encryption scheme that encrypts finite field elements, such as but not limited to, the Brakerski-Gentry-Vaikuntanathan (BGV) scheme (e.g., see Brakerski et al., "(Leveled) fully homomorphic encryption without bootstrapping", In *ITCS* 2012, pages 309-325, ACM, 2012") and the Brakerski-Fan-Vercauteren (BFV) scheme (e.g., see Brakerski et al., "Fully homomorphic encryption without modulus switching from classical GapSVP", In *CRYPTO* 2012, volume 7417 of *LNCS*, pages 868-886, Springer, Heidelberg, August 2012, and Fan et al., "Somewhat practical fully homomorphic encryption", Cryptology ePrint Archive, Report 2012/144, 2012).

In various embodiments, in relation to 104, performing a first block-wise operation may comprise performing a plurality of first operations between the first series of encrypted blocks and the second series of encrypted blocks, respectively. That is, a first operation is performed between each encrypted block of the first series of encrypted blocks and the corresponding encrypted block of the second series of encrypted blocks, respectively. For example, a first one of the plurality of first operations may be performed between a first encrypted block of the first series of encrypted blocks and a first encrypted block of the second series of encrypted blocks to obtain a first block-wise output of the first series of block-wise outputs, a second one of the plurality of first operations may be performed between a second encrypted block of the first series of encrypted blocks and a second encrypted block of the second series of encrypted blocks to obtain a second block-wise output of the first series of block-wise outputs, and so on (e.g., until the last encrypted block of the first and second series of encrypted blocks), resulting in the first series of block-wise outputs (e.g., corresponding to results of the first block-wise operation performed). In various embodiments, the plurality of first operations between the first series of encrypted blocks and the second series of encrypted blocks are performed simultaneously.

In various embodiments, in relation to 106, similarly, performing the second block-wise operation may comprise performing a plurality of second operations between the first series of encrypted blocks and the second series of encrypted blocks, respectively. That is, a second operation is performed between each encrypted block of the first series of encrypted blocks and the corresponding encrypted block of the second series of encrypted blocks, respectively. For example, a first one of the plurality of second operations may be performed between a first encrypted block of the first series of encrypted blocks and a first encrypted block of the second series of encrypted blocks to obtain a first block-wise output of the second series of block-wise outputs, a second one of the plurality of second operations may be performed between a second encrypted block of the first series of encrypted blocks and a second encrypted block of the second series of encrypted blocks to obtain a second block-wise output of the second series of block-wise outputs, and so on (e.g., until the last encrypted block of the first and second series of encrypted blocks), resulting in the second series of block-wise outputs (e.g., corresponding to results of the second block-wise operation performed). In various embodiments, the plurality of second operations between the first series of encrypted blocks and the second series of encrypted blocks are performed simultaneously.

Therefore, according to various embodiments of the present invention, the method of determining an order of encrypted inputs is advantageously block-based (based on encrypted blocks), thereby enabling various operations associated with the method to be performed block-wise simultaneously, resulting in improved efficiency and effectiveness. For example, multiple bits may be stored as an element (field element of a finite field) per encrypted block, which reduces the number of blocks generated and block-wise operations needed.

In various embodiments, the above-mentioned generating (at 102) a first series of encrypted blocks comprises generating each encrypted block in the first series of encrypted blocks as an encrypted element of a finite field, and the above-mentioned generating (at 102) a second series of encrypted blocks comprises generating each encrypted block in the second series of encrypted blocks as an encrypted element of the finite field. Accordingly, the method of determining an order of encrypted inputs according to various embodiments is advantageously based on or utilizes a finite field. For example, various embodiments find that using a finite field allows computations to be performed on multi-bit blocks without increasing the depth of the overall computation with Frobenius maps.

In various embodiments, the first series of encrypted blocks may also be referred to as a first vector of encrypted elements. Similarly, the second series of encrypted blocks may also be referred to as a second vector of encrypted elements. In various example embodiments, as will be described later below, the first series of encrypted blocks and the second series of encrypted blocks may be extracted from the first encrypted data and the second encrypted data, respectively, based on an extraction function. Therefore, according to various embodiments, each encrypted block in the first series of encrypted blocks and each encrypted block in the second series of encrypted blocks is advantageously an encrypted element of the finite field. In this regard, each element (encrypted element) may have multiple bits (e.g., at least two-bits), thus, various operations may be performed block-wise simultaneously with respect to elements having multiple bits, resulting in improved efficiency and effectiveness. For example, various embodiments find that having each encrypted block being an element of the finite field allows block-wise operations to be performed at lower depth with Frobenius maps compared to the encrypted blocks being integers.

In various embodiments, the first encrypted data and the second encrypted data are each a single encrypted element of the finite field. In various embodiments, the first series of encrypted blocks corresponds to a plurality of ciphertexts, and the second series of encrypted blocks corresponds to a plurality of ciphertexts. In this regard, an original (e.g., unencrypted or plaintext) data (e.g., the data representation thereof) may be encoded into an element (a single element) of a finite field, and the element corresponding to the original data may then be encrypted based on a homomorphic encryption scheme to produce an encrypted element (single encrypted element) of the finite field. A series of encrypted blocks (each being an encrypted element of the finite field and corresponding to a ciphertext) may then be extracted from the encrypted element using an extraction function, which corresponds to a plurality of ciphertexts.

Accordingly in the case of the first encrypted data and the second encrypted data each being a single encrypted element of the finite field, in various embodiments, there is provided a method of generating an encrypted data, the method comprising: encoding data (e.g., unencrypted or plaintext data) into an element (field element) of a finite element; and encrypting the element based on a homomorphic encryption scheme to generate the encrypted data. In this regard, the encrypted data is a single encrypted element of the finite field. In various embodiments, the method 100 of determining an order of encrypt inputs includes determining an order of multiple encrypted data, each encrypted data generated according to such a method.

In various embodiments, the first encrypted data comprises a third series of encrypted blocks, each encrypted block thereof being a single encrypted element of the finite field, and the second encrypted comprises a fourth series of encrypted blocks, each encrypted block thereof being a single encrypted element of the finite field. The third series of encrypted blocks may correspond to a single ciphertext, and the fourth series of encrypted blocks may correspond to a single ciphertext. In this regard, an original (e.g., unencrypted or plaintext) data (e.g., the data representation thereof) may first be segmented (or divided) into a series of blocks, each block may then be encoded into an element of a finite field. As a result, a series of encoded blocks may be obtained, each encoded block comprising the corresponding element (field element). The series of encoded block may then be subjected to a batch or parallel encryption to produce a single ciphertext comprising a series of encrypted blocks.

Accordingly, in various embodiments, there is provided a method of generating an encrypted data, the method comprising: segmenting (or dividing) data (e.g., unencrypted or plaintext data); encoding each block in the series of blocks into an element (field element) of a finite field to produce a series of elements (which may also be referred to as a vector of elements); and encrypting (e.g., batch encryption) the series of elements based on a homomorphic encryption scheme to generate the encrypted data, including a series of encrypted blocks. In this regard, the encrypted data corresponds to a single ciphertext. In various embodiments, the method 100 of determining an order of encrypt inputs includes determining an order of multiple encrypted data, each encrypted data generated according to such a method.

In the case of the first encrypted data comprising a third series of encrypted blocks and the second encrypted comprising a fourth series of encrypted blocks, in various embodiments, the above-mentioned generating (102) a first series of encrypted blocks comprises generating a plurality of first series of encrypted blocks from the first encrypted data, each first series of encrypted blocks thereof being generated from a corresponding encrypted block in the third series of encrypted blocks of the first encrypted blocks and each encrypted block of each first series of encrypted blocks thereof being an encrypted element of the finite field. Similarly, the above-mentioned generating (102) a second series of encrypted blocks comprises generating a plurality of second series of encrypted blocks from the second encrypted data, each second series of encrypted blocks thereof being generated from a corresponding encrypted block in the fourth series of encrypted blocks of the second encrypted blocks and each encrypted block of each second series of encrypted blocks thereof being an encrypted element of the finite field. Furthermore, the above-mentioned performing (104) a first block-wise operation comprising performing, for each of the plurality of first series of encrypted blocks, the first block-wise operation between the first series of encrypted blocks and the corresponding series of encrypted blocks of the plurality of second series of encrypted blocks (that is, for each corresponding pair of encrypted blocks in the first series of encrypted blocks and the second series of encrypted blocks) to obtain a corresponding first series of block-wise outputs (thereby obtaining a plurality of first series of block-wise outputs), and the above-mentioned performing a second block-wise operation comprising performing, for each of the plurality of first series of encrypted blocks, the second block-wise operation between the first series of encrypted blocks and the corresponding series of encrypted blocks of the plurality of second series of encrypted blocks (that is, for each corresponding pair of encrypted blocks in the first series of encrypted blocks and the second series of encrypted blocks) to obtain a corresponding second series of block-wise outputs (thereby obtaining a plurality of second series of block-wise outputs). Accordingly, a plurality of first series of block-wise outputs and a plurality of second series of block-wise outputs may be obtained.

In various embodiments, each encrypted block in the first series of encrypted blocks (or each encrypted block in each first series of encrypted blocks of the plurality of first series of encrypted blocks) generated from the first encrypted data may have a same size. In various embodiments, the size of the encrypted block may be a desired size or a predetermined size. For example, the size of the encrypted block may be predetermined based on the platform. For example, smaller block sizes result in more encrypted blocks which introduce more parallelism opportunities. In various embodiments, a first encrypted block to a penultimate encrypted block in the first series of encrypted blocks may have a same size and a last or remaining encrypted block in the first series of encrypted blocks may have a different size (e.g., a smaller size or fewer bits). That is, the size of each encrypted block in the first series of encrypted blocks may be the same except the last encrypted block.

Similarly, in various embodiments, each encrypted block in the second series of encrypted blocks (or each encrypted block in each second series of encrypted blocks of the plurality of second series of encrypted blocks) generated from the second encrypted data may have a same size. Similarly, in various embodiments, a first encrypted block to a penultimate encrypted block in the second series of encrypted blocks may have a same size and a last or remaining encrypted block in the second series of encrypted blocks may have a different size (e.g., a smaller size).

In various embodiments, the first series of encrypted blocks (or each first series of encrypted blocks of the plurality of first series of encrypted blocks) generated from the first encrypted data corresponds to a vector space representation of the first encrypted data (or a vector space representation of the corresponding encrypted block of first encrypted data) with respect to the finite field, and the second series of encrypted blocks (or each second series of encrypted blocks of the plurality of second series of encrypted blocks) generated from the second encrypted data) generated from the second encrypted data corresponds to a vector space representation of the second encrypted data (or a vector space representation of the corresponding encrypted block of second encrypted data) with respect to the finite field. In this regard, in various embodiments, the element in each encrypted block of the first series of encrypted blocks may correspond to a coefficient of a polynomial representing the first encrypted data with respect to the finite field, which may be equivalent to or corresponds to a component of the vector space representation of the first encrypted data with respect to the finite field. Accordingly, the first series of encrypted blocks may be in the form of a first series of encrypted elements, or a first series of encrypted coefficients relating to the first encrypted data with respect to the finite field. Accordingly, the first series of encrypted blocks may thus also be referred to as a first vector of field elements (encrypted field elements).

Similarly, in various embodiments, the element in each encrypted block of the second series of encrypted blocks may corresponding to a coefficient of a polynomial representing the second encrypted data with respect to the finite field, which may be equivalent to or corresponds to a component of the vector space representation of the second encrypted data with respect to the finite field. Accordingly, the second series of encrypted blocks may be in the form of a second series of encrypted elements, or a second series of encrypted coefficients relating to the second encrypted data with respect to the finite field. Accordingly, the second series of encrypted blocks may thus also be referred to as a second vector of field elements (encrypted field elements).

In various embodiments, the finite field has a vector space with power basis $\{1, t, t^2, \ldots, t^{\ell-1}\}$, where $\ell$ denotes a degree of an irreducible polynomial and t denotes a root of the irreducible polynomial of degree $\ell$. For example, an encrypted data may be an encrypted polynomial (corresponding to a single encrypted element of a finite field), and in relation to generating (extracting) a series of encrypted blocks from the encrypted data, the following provides examples for illustration purpose only and without limitations. An example encrypted polynomial $x^3+0x^2+x+0$ may be extracted into (x+0 (from $x^3+0x^2$), x+0 (from x+0)) (that is, a series of two encrypted blocks, each encrypted blocks having two bits) or extracted into (1, 0, 1, 0) (that is, a series of four encrypted blocks, each encrypted block having one bit). Another example encrypted polynomial $2x^5+x^4+0x^3+3x^2+0x+4$ may be extracted into (2x+1, 0x+3, 0x+4) (that is, a series of three encrypted blocks, each encrypted block having two bits), extracted into ($2x^2+x+0$, $3x^2+0x+4$) (that is, a series of two encrypted blocks, each encrypted block having four bits) or extracted into (2, 1, 0, 3, 0, 4) (that is, a series of six encrypted blocks, each encrypted block having one bit). Accordingly, in various embodiments, the encrypted polynomial may be a single encrypted field element and is a single ciphertext. The encrypted polynomial may then be segmented into a vector of ciphertexts (which may also be referred to as a series of encrypted blocks), each ciperhtext corresponding to one block (which may include multiple coefficients as illustrated in the above examples).

In various embodiments, a first encrypted block to a penultimate encrypted block of the first series of encrypted blocks (or of each first series of encrypted blocks of the plurality of first series of encrypted blocks) each has a size of at least two bits (i.e., multiple bits), and a first encrypted block to a penultimate encrypted block of the second series of encrypted blocks (or of each second series of encrypted blocks of the plurality of second series of encrypted blocks) each has a size of at least two bits (i.e., multiple bits).

In various embodiments, the first block-wise operation is based on a less-than or greater-than block-wise comparison operation, and the second block-wise operation is based on an equality block-wise comparison operation.

In various embodiments, similarly as described hereinbefore with respect to the first block-wise operation, for example in the case of the first block-wise operation being a less-than block-wise comparison operation, performing the less-than block-wise comparison operation may comprise performing a plurality of less-than comparison operation between the first series of encrypted blocks and the second series of encrypted blocks, respectively. That is, a less-than comparison operation is performed between each encrypted block of the first series of encrypted blocks and the corresponding encrypted block of the second series of encrypted blocks, respectively. In various embodiments, the less-than comparison operation performed on a first encrypted block and a second encrypted block may output a '1' if the first encrypted block is less than the second encrypted block, and may output a '0' otherwise.

In various embodiments, similarly as described hereinbefore with respect to the first block-wise operation, for example in the case of the first block-wise operation being a greater-than block-wise comparison operation, performing the greater-than block-wise comparison operation may comprise performing a plurality of greater-than comparison operation between the first series of encrypted blocks and the second series of encrypted blocks, respectively. That is, a greater-than comparison operation is performed between each encrypted block of the first series of encrypted blocks and the corresponding encrypted block of the second series of encrypted blocks, respectively. In various embodiments, the greater-than comparison operation performed on a first encrypted block and a second encrypted block may output a '1' if the first encrypted block is greater than the second encrypted block, and may output a '0' otherwise.

It will be appreciated by a person skilled in the art that a less-than block-wise comparison operation or a less-than comparison operation is simply an opposite operation to a greater-than block-wise comparison operation or a greater-than comparison operation, and vice versa, and thus these two operations may be interchanged accordingly as desired or as appropriate, without going beyond the scope of the present invention.

In various embodiments, similarly as described hereinbefore with respect to the second block-wise operation, performing an equality block-wise comparison operation may comprise performing a plurality of equality comparison operation between the first series of encrypted blocks and the second series of encrypted blocks, respectively. That is, an equality comparison operation is performed between each encrypted block of the first series of encrypted blocks and the corresponding encrypted block of the second series of encrypted blocks, respectively. In various embodiments, the equality comparison operation performed on a first encrypted block and a second encrypted block may output a '1' if the first encrypted block is equal the second encrypted block, and may output a '0' otherwise.

In various embodiments, the above-mentioned determining (at 108) the order of the first and second encrypted data comprises performing, for each block-wise output of the second series of block-wise outputs from a second block-wise output to a penultimate block-wise output, a multiplication of the block-wise output and each block-wise output subsequent to the block-wise output to produce a first series of intermediate results. In various embodiments, a first block-wise output and a last block-wise output of the second series of block-wise outputs is a least significant block-wise output (e.g., corresponds to a least significant position) and a most significant block-wise output (e.g., corresponds to a most significant position) of the second series of block-wise outputs, respectively. In this regard, for example, the least significant block-wise output is the block-wise output based on the least significant encrypted block of the first series of encrypted blocks and the least significant encrypted block of the second series of encrypted blocks. Similarly, the most significant block-wise output is the block-wise output based on the most significant encrypted block of the first series of encrypted blocks and the most significant encrypted block of the second series of encrypted blocks. In various embodiments, each block-wise output subsequent to a block-wise output refers to each block-wise output that has (or is associated with) a more significant position in the series than the above-mentioned block-wise output, that is, with respect to a direction towards the most significant block-wise output of the series.

In various embodiments, the above-mentioned determining (at 108) the order of the first and second encrypted data further comprises performing, for each block-wise output of the first series of block-wise outputs, a multiplication of the block-wise output with the intermediate result of the first series of intermediate results corresponding to the block-wise output, to produce a second series of intermediate results.

In various embodiments, the above-mentioned determining (at 108) the order of the first and second encrypted data further comprises: combining the second series of intermediate results to obtain a combined result; and determining the order of the first and second encrypted data based on the combined result. In various embodiments, in the case of the first and second encrypted data each being a single encrypted element of the finite field and the first block-wise operation being a less-than block-wise comparison operation, the first encrypted data may be determined to be less than the second encrypted data (corresponding to the order of the first and second encrypted data) if the combined result is greater than zero (e.g., is a positive integer). In various embodiments, in the case of the first and second encrypted data each being a single encrypted element of the finite field and the first block-wise operation being a greater-than block-wise comparison operation, the first encrypted data may be determined to be greater than the second encrypted data (corresponding to the order of the first and second encrypted data) if the combined result is greater than zero (e.g., is a positive integer).

Figure 2:
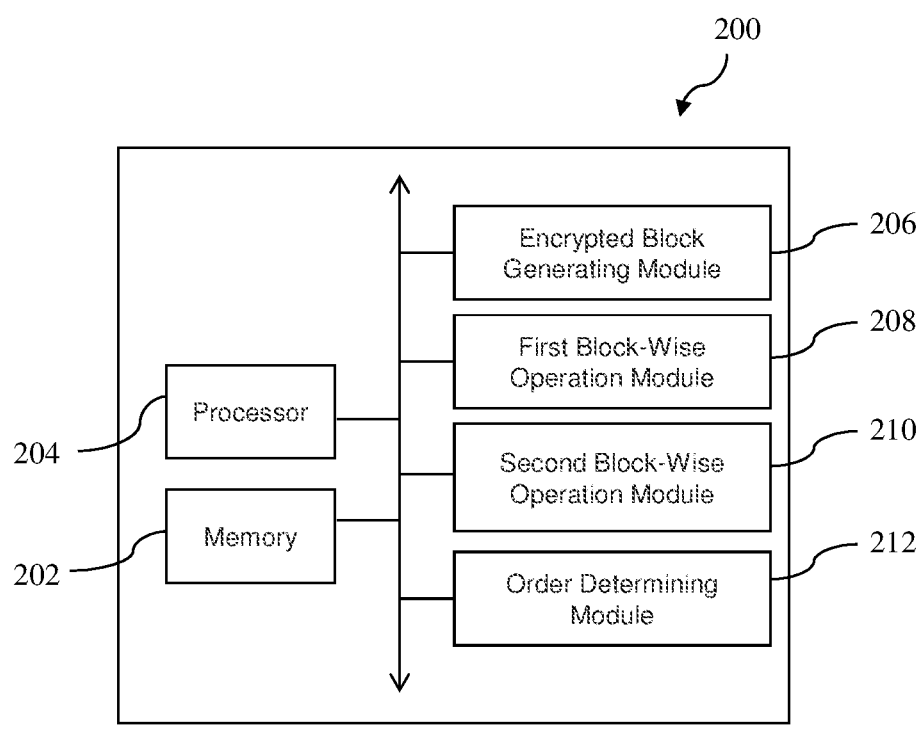
FIG. 2 depicts a schematic block diagram of a system for determining an order of encrypted inputs, according to various embodiments of the present invention, such as corresponding to the method as described with reference to FIG. 1.

FIG. 2 depicts a schematic block diagram of a system 200 for determining an order of encrypted inputs, including a first encrypted input and a second encrypted input, the first encrypted input including a first encrypted data and the second encrypted input including a second encrypted data, each of the first and second encrypted data being encrypted based on a homomorphic encryption scheme, according to various embodiments of the present invention, such as corresponding to the method 100 of determining an order of encrypted inputs as described hereinbefore according to various embodiments of the present invention with reference to FIG. 1. The system 200 comprises a memory 202, and at least one processor 204 communicatively coupled to the memory 202 and configured to: generate a first series of encrypted blocks from the first encrypted data and a second series of encrypted blocks from the second encrypted data; perform a first block-wise operation between the first series of encrypted blocks and the second series of encrypted blocks to obtain a first series of block-wise outputs; perform a second block-wise operation between the first series of encrypted blocks and the second series of encrypted blocks to obtain a second series of block-wise outputs; and determine an order of the first and second encrypted data based on the first series of block-wise outputs and the second series of block-wise outputs.

It will be appreciated by a person skilled in the art that the at least one processor 204 may be configured to perform the required functions or operations through set(s) of instructions (e.g., software modules) executable by the at least one processor 204 to perform the required functions or operations. Accordingly, as shown in FIG. 2, the system 200 may comprise: an encrypted block generating module (or an encrypted block generating circuit) 206 configured to generate a first series of encrypted blocks from the first encrypted data and a second series of encrypted blocks from the second encrypted data; a first block-wise operation module (or a first block-wise operation circuit) 208 configured to perform a first block-wise operation between the first series of encrypted blocks and the second series of encrypted blocks to obtain a first series of block-wise outputs; a second block-wise operation module (or a second block-wise operation circuit) 210 configured to perform a second block-wise operation between the first series of encrypted blocks and the second series of encrypted blocks to obtain a second series of block-wise outputs; and an order determining module (or an order determining circuit) 212 configured to determine an order of the first and second encrypted data based on the first series of block-wise outputs and the second series of block-wise outputs.

It will be appreciated by a person skilled in the art that the above-mentioned modules are not necessarily separate modules, and two or more modules may be realized by or implemented as one functional module (e.g., a circuit or a software program) as desired or as appropriate without deviating from the scope of the present invention. For example, two or more of the encrypted block generating module 206, the first block-wise operation module 208, the second block-wise operation module 210 and the order determining module 212 may be realized (e.g., compiled together) as one executable software program (e.g., software application or simply referred to as an "app"), which for example may be stored in the memory 202 and executable by the at least one processor 204 to perform the functions/operations as described herein according to various embodiments.

In various embodiments, the system 200 corresponds to the method 100 as described hereinbefore with reference to FIG. 1, therefore, various functions or operations configured to be performed by the least one processor 204 may correspond to various steps of the method 100 described hereinbefore according to various embodiments, and thus need not be repeated with respect to the system 200 for clarity and conciseness. In other words, various embodiments described herein in context of the methods (e.g., the method 100) are analogously valid for the respective systems (e.g., the system 200), and vice versa.

For example, in various embodiments, the memory 202 may have stored therein the encrypted block generating module 206, the first block-wise operation module 208, the second block-wise operation module 210 and/or the order determining module 212, which respectively correspond to various steps of the method 100 as described hereinbefore according to various embodiments, which are executable by the at least one processor 204 to perform the corresponding functions/operations as described herein.

A computing system, a controller, a microcontroller or any other system providing a processing capability may be provided according to various embodiments in the present disclosure. Such a system may be taken to include one or more processors and one or more computer-readable storage mediums. For example, the system 200 described hereinbefore may include a processor (or controller) 204 and a computer-readable storage medium (or memory) 202 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "generating", "performing", "determining", "encoding" or the like, refer to the actions and processes of a computer system, or similar electronic device, that manipulates and transforms data represented as physical quantities within the computer system into other data similarly represented as physical quantities within the computer system or other information storage, transmission or display devices.

The present specification also discloses a system (e.g., which may also be embodied as a device or an apparatus), such as the system 200, for performing the operations/ functions of the method(s) described herein. Such a system may be specially constructed for the required purposes, or may comprise a general purpose computer or other device selectively activated or reconfigured by a computer program stored in the computer. The algorithms presented herein are not inherently related to any particular computer or other apparatus. Various general-purpose machines may be used with computer programs in accordance with the teachings herein. Alternatively, the construction of more specialized apparatus to perform the required method steps may be appropriate.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention. It will be appreciated by a person skilled in the art that various modules described herein (e.g., the encrypted block generating module 206, the first block-wise operation module 208, the second block-wise operation module 210 and/or the order determining module 212) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums (non-transitory computer-readable storage medium), comprising instructions (e.g., the encrypted block generating module 206, the first block-wise operation module 208, the second block-wise operation module 210 and/or the order determining module 212) executable by one or more computer processors to perform a method 100 of determining an order of encrypted inputs as described hereinbefore with reference to FIG. 2. Accordingly, various computer programs or modules described herein may be stored in a computer program product receivable by a system therein, such as the system 200 as shown in FIG. 2, for execution by at least one processor 204 of the system 200 to perform the required or desired functions.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

Figure 3:
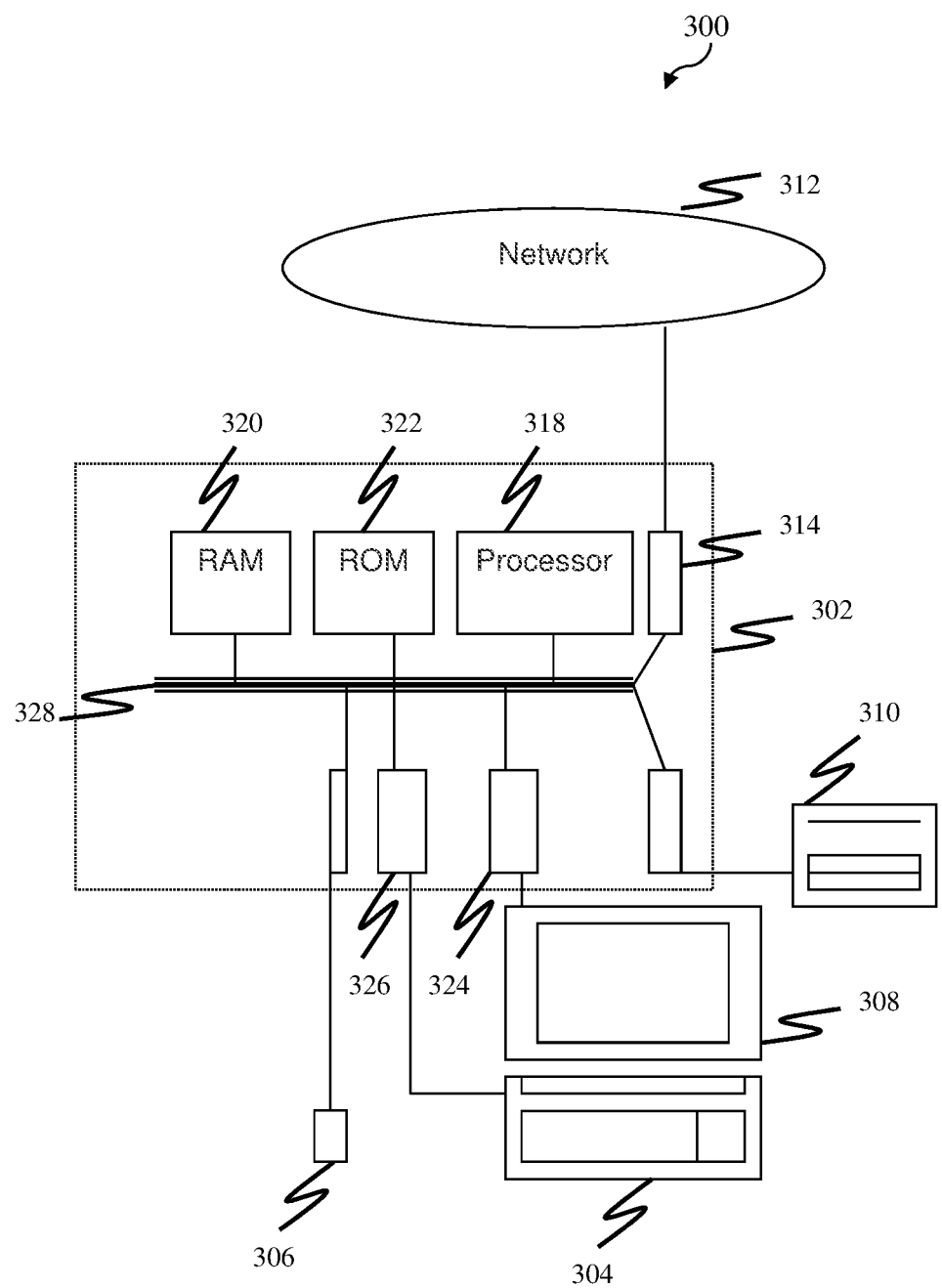
FIG. 3 depicts a schematic block diagram of an exemplary computer system in which the system for determining an order of encrypted inputs according to various embodiments of the present invention may be realized or implemented.

In various embodiments, the system 200 may be realized by any computer system (e.g., desktop or portable computer system) including at least one processor and a memory, such as a computer system 300 as schematically shown in FIG. 3 as an example only and without limitation. Various methods/steps or functional modules (e.g., the encrypted block generating module 206, the first block-wise operation module 208, the second block-wise operation module 210 and/or the order determining module 212) may be implemented as software, such as a computer program being executed within the computer system 300, and instructing the computer system 300 (in particular, one or more processors therein) to conduct the methods/functions of various embodiments described herein. The computer system 300 may comprise a computer module 302, input modules, such as a keyboard 304 and a mouse 306, and a plurality of output devices such as a display 308, and a printer 310. The computer module 302 may be connected to a computer network 312 via a suitable transceiver device 314, to enable access to e.g., the Internet or other network systems such as Local Area Network (LAN) or Wide Area Network (WAN). The computer module 302 in the example may include a processor 318 for executing various instructions, a Random Access Memory (RAM) 320 and a Read Only Memory (ROM) 322. The computer module 302 may also include a number of Input/Output (I/O) interfaces, for example I/O interface 324 to the display 308, and I/O interface 326 to the keyboard 304. The components of the computer module 302 typically communicate via an interconnected bus 328 and in a manner known to the person skilled in the relevant art.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

In particular, for better understanding of the present invention and without limitation or loss of generality, various example embodiments of the present invention will now be described with respect to determining an order of (or between) two encrypted data (of two encrypted inputs), of which may be referred to as a first encrypted data and a second encrypted data. By way of an example only and without limitation, the first encrypted data and the second encrypted data each corresponds to an integer, unless stated otherwise. Furthermore, the first block-wise operation is a less-than block-wise comparison operation, and the order of the two encrypted data is determined with respect to whether the first encrypted data is less than the second encrypted data.

Various example embodiments provide an efficient and scalable cipertext (encrypted data) operations for accelerated fully homomorphic encryption (FHE) computation.

Figure 4:
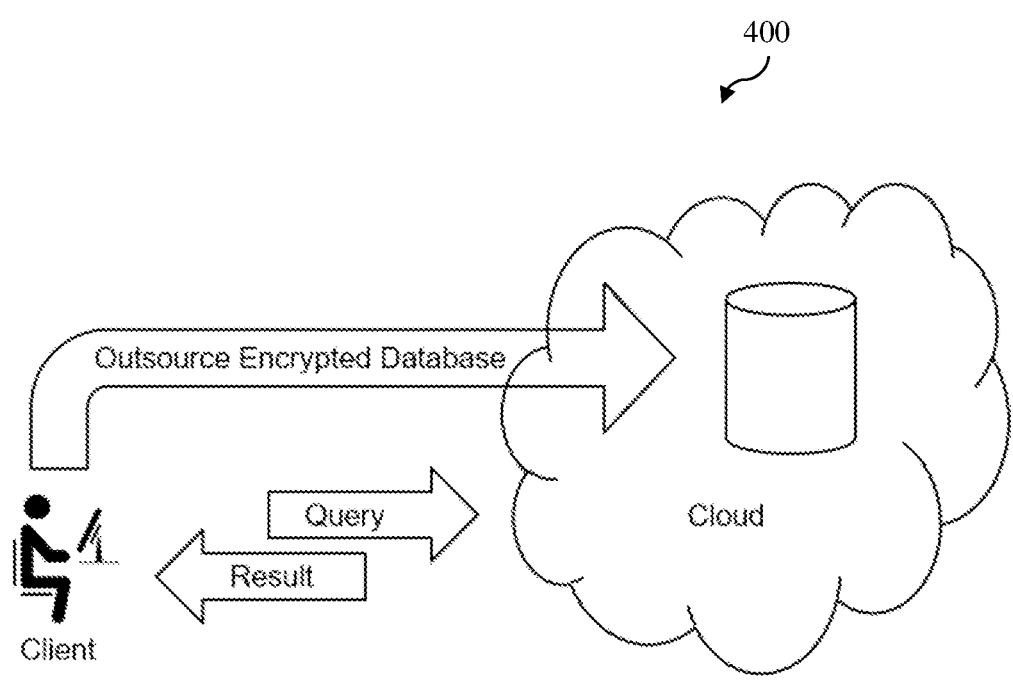
FIG. 4 depicts a schematic drawing showing an overview of an example application associated with the method of determining an order of two encrypted data, according to various example embodiments of the present invention.

FIG. 4 depicts a schematic drawing showing an overview of an example application 400 associated with a method of determining an order of two encrypted data, according to various example embodiments of the present invention. As shown in FIG. 4, encrypted data of a client may be stored in a database in a cloud server, and the client may subsequently perform a query task on encrypted data stored in the database. In the example application shown in FIG. 4, the query task initiated by the client may involve determining an order of encrypted data, such as determining whether a query input (e.g., including an encrypted data) is less than (or smaller than) an encrypted data stored in the database at the cloud server. A result (e.g., encrypted result) of the query task may then be transmitted to client.

Figure 5:
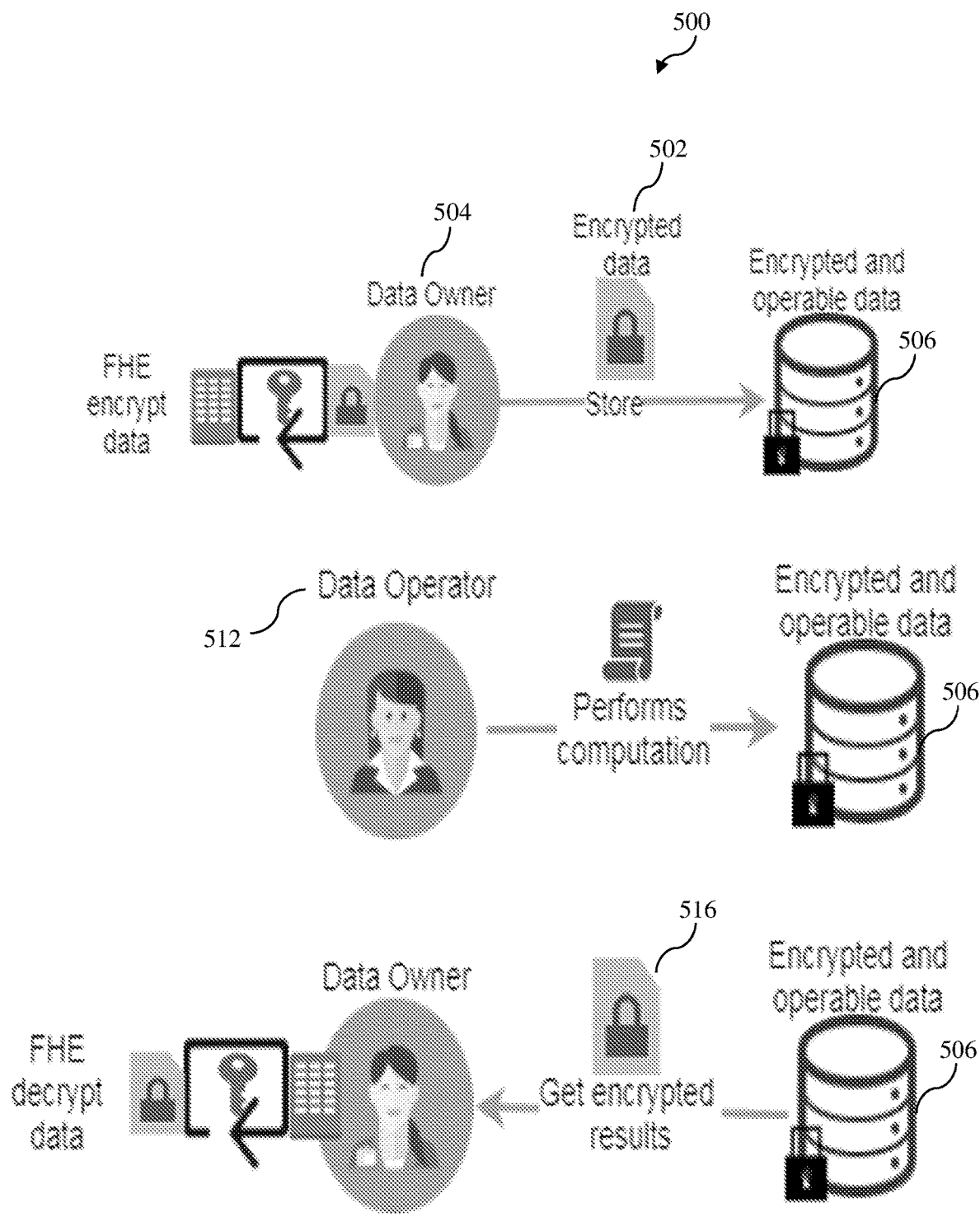
FIG. 5 depicts a schematic drawing showing an overview of another example application associated with the method of determining an order of two encrypted data, according to various example embodiments of the present invention.

FIG. 5 depicts a schematic drawing showing an overview of another example application 500 associated with a method of determining an order of two encrypted data, according to various example embodiments of the present invention. As shown in FIG. 5, one or more encrypted data 502 of a data owner 504 may be encrypted based on a FHE scheme. The one or more encrypted data 502 may then be transmitted and stored in a database 506. Various tasks (e.g., operations or computations) may then be performed on the one or more encrypted data 502 stored in the database 506, such as initiated by a data operator 512. In this regard, for example, a task may involve determining an order of encrypted data, such as determining whether a query input (e.g., including an encrypted data) is less than (or smaller than) the one or more encrypted data 502 stored in the database 506. A result (e.g., encrypted result) 516 of the task may then be transmitted to data owner, and decrypted to obtain the unencrypted result.

According to various example embodiments, there is provided a method for evaluating comparisons on encrypted data (e.g., represented as binary strings), such as between two encrypted data, with FHE using (binary) finite fields (e.g., corresponding to the method 100 of determining an order of encrypted inputs as described hereinbefore according to various embodiments). To obtain encrypted data, a string may be broken down (or segmented) into blocks of size up to $\ell$ and these blocks may then be encoded into elements of $\mathbb{F}_{2^\ell}$. A technique (e.g., including an algorithm) may be configured to compute the order of two blocks and extend it to determine the order of the encrypted data that have been encoded into blocks. Accordingly, a method (e.g., including an algorithm) for determining (or computing) the order of encrypted data may be provided. Based on the method, for example, comparisons on several hundred integers may be simultaneously evaluated or performed. In addition, according to various example embodiments, an extraction technique is introduced that allows the comparisons to be performed with depth comparable to the conventional Boolean circuit method. Experiments were also conducted to demonstrate the efficiency and effectiveness of the method of determining an order of encrypted inputs according to various example embodiments of the present invention. As an example application, by way of an example and without limitation, a private database query protocol was implemented that returns all values whose corresponding key is less than an encrypted query value.

For better understanding of the present invention, but without limitations, various notations used when describing the method of determining an order of encrypted inputs according to various example embodiments of the present invention will now be described below as a form of background.

Notation

In various example embodiments, $a \leftarrow_\$ A$ denotes that a is chosen uniformly at random from set A. For an algorithm A, $A \rightarrow a$ denotes that the output of algorithm A is a. The encryption of a plaintext message a is denoted by $\overline{a}$ and the encryption of a vector of plaintext messages $(a_1, \ldots, a_n)$ is denoted by $\overline{(a_1, \ldots, a_n)}$. The set of integers from 1 to a is denoted by [a] and the largest (resp. smallest) integer that is smaller (resp. larger) than or equal to a real number a is denoted by $\lfloor a \rfloor$ (resp. $\lceil a \rceil$).

In various example embodiments, a finite extension field $\mathbb{F}_{p^\ell}$ of characteristic p and extension degree $\ell$ is used, where $\mathbb{F}_{p^\ell} = \{(\sum_{i=0}^{\ell-1} \gamma_i t^i) \bmod g(x) | \gamma_i \in \mathbb{F}_p$, t the root of an irreducible polynomial $g(x) \in \mathbb{F}_p[x]\}$. The following notation, $[\gamma_0, \gamma_1, \ldots, \gamma_{\ell-1}]$, may also be used to emphasize the vector space structure of $\mathbb{F}_{p^\ell}$. Log denotes logarithms in base-2 and if other bases (p>2), logarithms may be denoted as $\log_p$.

The security parameter is denoted by $\lambda$ and for simplicity, according to various example embodiments, it is assumed that all algorithms take the security parameter as an input. A function $\varepsilon: \mathbb{N} \rightarrow \mathbb{R}$ is negligible in $\lambda$, if for all positive polynomials $p(\cdot)$ and sufficiently large $\lambda$, $$\varepsilon(\lambda) \leq \frac{1}{p(\lambda)}.$$

In various example embodiments, $\text{poly}(\lambda)$ and $\text{negl}(\lambda)$ may be used to represent unspecified polynomials and negligible functions in $\lambda$, respectively. In various example embodiments, a probabilistic polynomial-time (PPT) algorithm is a randomised algorithm that runs in time $\text{poly}(\lambda)$.

Finite Extension Fields

By way of background only to facilitate better understanding of the present invention, but without limitations, several lemmas for working in plaintext spaces other than $\mathbb{F}_2$ will now be described.

Definition 1: Let p be a prime and $\ell$ and n be positive integers. A polynomial $f \in \mathbb{F}_{p^\ell}[x_1, x_2, \ldots, x_n]$ is a polynomial expression of a function $\varphi: (\mathbb{F}_{p^\ell})^n \rightarrow \mathbb{F}_{p^\ell}$ if $f(a_1, a_2, \ldots, a_n) = \varphi(a_1, a_2, \ldots, a_n)$ for all $(a_1, a_2, \ldots, a_n) \in (\mathbb{F}_{p^\ell})^n$.

With Definition 1, it is possible to relate functions to polynomials over $\mathbb{F}_{p^\ell}$. The following lemma guarantees that there is a unique polynomial expression with a particular property, $\min_\varphi$, for a function $\varphi: (\mathbb{F}_{p^\ell})^n \rightarrow \mathbb{F}_{p^\ell}$.

Lemma 1: Let p be a prime and κ and n be positive integers. For any function φ: $(\mathbb{F}_{p^\ell})^n \to \mathbb{F}_{p^\ell}$, there exists a unique polynomial expression $\min_\varphi \in \mathbb{F}_{p^\ell}[x_1, x_2, \ldots, x_n]$ of φ whose degree is at most $p^\ell - 1$ with respect to each variable.

This unique polynomial expression $\min_\varphi$ is called the minimal polynomial expression of a function φ and it has a property that is useful for designing efficient algorithms to evaluate φ on encrypted data.

Lemma 2: For a function φ: $(\mathbb{F}_{p^\ell})^n \to \mathbb{F}_{p^\ell}$ with n, p and $\ell$ as in Lemma 1, the minimal polynomial expression of φ has the minimum total degree among all polynomial expressions of φ.

The total degree of a polynomial determines the multiplicative depth required for evaluating that polynomial. Thus, according to various example embodiments, it is noted that Lemma 2 implies that it is possible to evaluate a function φ with minimum multiplicative depth by evaluating $\min_\varphi$ using general FHE schemes.

According to various example embodiments, after establishing a connection or relationship between a function and polynomial expressions, the next step is to find the minimal polynomial expression. In various example embodiments, Lagrange interpolation is used to find the minimal polynomial expression. Below, a theorem of Lagrange interpolation for 2-variable functions defined on $\mathbb{F}_{p^\ell}^2$ is provided, which is related to comparison functions between two elements in $\mathbb{F}_{p^\ell}$.

Theorem 1 (Lagrange Interpolation): Given the output of a function φ on all possible points in $\mathbb{F}_{p^\ell}^2$, a polynomial expression $f(x, y)$ of φ can be constructed as:

$$f(x, y) = \sum_{x_i, y_i \in \mathbb{F}_{p^\ell}} \varphi(x_i, y_i) \left( \prod_{\substack{x_\alpha \neq x_i \\ x_\alpha \in \mathbb{F}_{p^\ell}}} \frac{x - x_\alpha}{x_i - x_\alpha} \right) \left( \prod_{\substack{y_\beta \neq y_i \\ y_\beta \in \mathbb{F}_{p^\ell}}} \frac{y - y_\beta}{y_j - y_\beta} \right) \quad \text{(Equation 1)}$$

Then, $f(x, y)$ is the polynomial that evaluates to $\varphi(x^*, y^*)$ for any point $(x^*, y^*) \in \mathbb{F}_{p^\ell}^2$. The degrees of x and y in $f$ are both at most $p^\ell - 1$, respectively, and so the total degree of $f$ is at most $2p^\ell - 2$.

With this theorem, for example, block-wise less-than and equality comparisons are translated into polynomial evaluations, facilitating homomorphic computation on encrypted blocks.

The following corollary states that the polynomial $f(x, y)$ specified in Theorem 1 is the minimal polynomial expression of $\varphi(x, y)$ by Lemma 1.

Corollary 1. The polynomial $f(x, y)$ as specified by Theorem 1 is the minimal polynomial expression of $\varphi(x, y)$ This clarifies that $f$ on encrypted blocks can be computed with φ using minimal depth.

Proof. Since the degrees of x and y in $f(x, y)$ are both at most $p^\ell - 1$, it is straightforward by Lemma 1.

Let g(x) be an irreducible polynomial of degree $\ell$, where $\mathbb{F}_{p^\ell}$ is isomorphic to $\mathbb{F}_p[x]/(g(x))$ for a prime p, and let t∈ $\mathbb{F}_{p^\ell}$ be a root of g(x). Then, the finite field $\mathbb{F}_{p^\ell}$ can be considered as an $\ell$-dimensional vector space $(\mathbb{F}_p)^\ell$ with power basis $\{1, t, t^2, \ldots, t^{\ell-1}\}$. A useful property of finite extension fields that may be used according to various example embodiments may now be introduced, namely, linear maps on $(\mathbb{F}_p)^\ell$.

Lemma 3: Let T be a $\mathbb{F}_p$-linear map on $\mathbb{F}_{p^\ell}$ for a prime p and a positive integer $\ell$. Denote by τ(x) the Frobenius map on $\mathbb{F}_{p^\ell}$ which sends x to $x^p$. There is a unique set of constants $\{\rho_0, \rho_1, \ldots, \rho_{\ell-1}\}$, $\rho_i \in \mathbb{F}_{p^\ell}$ $$T(\mu) = \zeta_T(\mu) = \sum_{i=0}^{\ell-1} \rho_i \tau^i(\mu). \quad \text{(Equation 2)}$$

This Lemma shows that $\mathbb{F}_p$-linear maps can be evaluated by constant multiplication and Frobenius map evaluations, which are available with some homomorphic encryption schemes, for example, as described hereinbefore. In particular, method or technique according to various example embodiments leverages $\mathbb{F}_p$-linear maps to extract the encrypted blocks from the encrypted field element encoding the data.

Fully Homomorphic Encryption

In various example embodiments, a leveled fully homomorphic encryption (FHE) scheme is a FHE scheme which supports L-depth circuits, where L is a parameter of the FHE scheme. In various example embodiments, the leveled FHE scheme is a 4-tuple of probabilistic polynomial time algorithms (KeyGen, Enc, Dec, Eval) as follows:

(pk, evk, sk)←KeyGen($1^\lambda$, L): Taking as inputs security parameter λ and maximum depth L, output public key pk, evaluation key evk, secret key sk.

c=m̄←Enc(pk, m): Taking as inputs public key pk and plaintext m∈P for plaintext space P, output ciphertext c which is an encryption of m.

m'←Dec(sk, c): Taking as inputs secret key sk and ciphertext c, outputs plaintext m'.

c'←Eval(evk, φ, $\overline{m}_1, \overline{m}_2, \ldots, \overline{m}_n$): Taking as inputs evaluation key evk, n-variate polynomial expression φ of total degree at most $2^L$ and n ciphertexts $\overline{m}_1, \ldots, \overline{m}_n$, output a ciphertext c' such that c'=$\overline{\varphi(m_1,\ldots,m_n)}$.

Accordingly, in various example embodiments, encrypted data (e.g., the first and second encrypted data as described herein according to various embodiments) may be formed using the above-mentioned leveled FHE.

In relation to batching and Frobenius map operations, Smart and Vercauteren (see Smart et al., "Fully Homomorphic SIMD operations", Cryptology ePrint Archive, Report 2011/133, 2011) showed that some FHE schemes can support single instruction multiple data (SIMD) operations, also known as batching, through the use of Chinese Remainder Theorem on number fields and suitable parameter selection.

First, various example embodiments note that cyclotomic polynomial modulus $\Phi_m(x) = \Pi_{i=1}^\delta f_i(x)$ decomposes into δ irreducible factors of degree $\ell$ modulo p, for a chosen plaintext characteristic p. Then, with the Chinese Remainder Theorem isomorphism $\Pi_{i=1}^\delta \mathbb{Z}_p[x]/f_i(x) \to \mathbb{Z}_p[x]/\Phi_m(x)$, according to various example embodiments, it is possible to encrypt δ many elements into one ciphertext by encoding them into $\mathbb{Z}_p[x]/f_i(x)$. The algebra of each $\mathbb{Z}_p[x]/f_i(x)$ is $\mathbb{F}_{p^\ell}$ since $f_i(x)$ is an irreducible polynomial of degree $\mathbb{Z}$ modulo p.

With this, the plaintext space of compatible FHE schemes may be partitioned into a vector of plaintext "slots", with a single addition or multiplication on ciphertexts resulting in component-wise addition or multiplication on the vector of plaintexts. The plaintext algebra for these slots are finite extension fields $\mathbb{F}_{p^\ell}$ for which Gentry et al. (see Gentry et al., "Fully homomorphic encryption with polylog overhead", In *EUROCRYPT* 2012, volume 7237 of *LNCS*, pages 465-482, Springer, Heidelberg, 2012) described how to perform rotation, shifts and Frobenius map evaluations without consuming depth for the Brakerski-Gentry-Vaikuntanathan (BGV) FHE scheme (see Brakerski et al., "(Leveled) fully homomorphic encryption without bootstrapping. In *ITCS* 2012, pages 309-325, ACM, 2012").

A ring-LWE variant of Brakerski's (see Brakerski et al., "Fully homomorphic encryption without modulus switching from classical GapSVP", In *CRYPTO* 2012, volume 7417 of *LNCS*, pages 868-886, Springer, Heidelberg, August 2012) LWE scheme by Fan and Vercauteren (BFV) (see Fan et al., "Somewhat practical fully homomorphic encryption", Cryptology ePrint Archive, Report 2012/144, 2012) can also be adapted to support these operations. Furthermore, there is a software library for homomorphic encryption, HElib, by Halevi and Shoup (e.g., see Halevi et al., "Algorithms in HElib", In *CRYPTO* 2014, Part I, volume 8616 of *LNCS*, pages 554-571, Springer, Heidelberg, 2014 and Halevi et al., "Bootstrapping for HElib", In *EUROCRYPT* 2015, Part I, volume 9056 of *LNCS*, pages 641-670, Springer, Heidelberg 2015) that implements the necessary algorithms to fully utilize the plaintext space with BGV as the base FHE scheme.

In relation to parameters with respect to performance, for leveled FHE schemes, the parameters for maximum depth L and security level λ both affect performance. Supporting deeper circuits with bigger L means larger parameter sizes, thereby increasing the time required to evaluate circuits and space used to encrypt data. Thus, algorithms according to various example embodiments have as low a depth as possible to optimize FHE performance.

Finite Field Encoding for Integer Comparisons

In various example embodiments, there are a total of six different comparisons possible on data that can be ordered, two on (in)equality (EQ, NEQ) and four on order (LT, GT, LEQ, GEQ). In this regard, various example embodiments are directed to order comparisons. For a totally ordered set $(S, \leq_S)$, such as the integers $(\mathbb{Z}, <)$, the results of the comparisons may be defined as follows:

$$LT_S(x, y) = \begin{cases} 1, & \text{if } x <_S y (\Leftrightarrow \neg (y \leq_S x)); \\ 0, & \text{otherwise} \end{cases} \quad \text{(Equation 3)}$$

$$LEQ_S(x, y) = \begin{cases} 1, & \text{if } x \leq_S y; \\ 0, & \text{otherwise} \end{cases} \quad \text{(Equation 4)}$$

$$EQ_S(x, y) = \begin{cases} 1, & \text{if } x = y; \\ 0, & \text{otherwise} \end{cases} \quad \text{(Equation 5)}$$

$$GT_S(x, y) = \begin{cases} 1, & \text{if } x >_S y (\Leftrightarrow \neg (y \leq_S x)); \\ 0, & \text{otherwise} \end{cases} \quad \text{(Equation 6)}$$

$$GEQ_S(x, y) = \begin{cases} 1, & \text{if } x \geq_S y (\Leftrightarrow \neg (y \leq_S x)); \\ 0, & \text{otherwise} \end{cases} \quad \text{(Equation 7)}$$

$$NEQ_S(x, y) = \begin{cases} 1, & \text{if } \neg (x = y); \\ 0, & \text{otherwise} \end{cases} \quad \text{(Equation 8)}$$

According to various example embodiments, a method for determining (e.g., an algorithm for computing) a less-than comparison ($LT(\bar{x}, \bar{y})$) on encrypted data is provided. This may correspond to the method of determining an order of encrypted inputs (e.g., with respect to a first encrypted input comprising a first encrypted data $\bar{x}$ and a second encrypted input comprising a second encrypted data $\bar{y}$) as described hereinbefore according to various embodiments. For example, if the less-than comparison ($LT(\bar{x}, \bar{y})$) returns true (i.e., $\bar{x}$ is less than $\bar{y}$), then the order of the encrypted inputs is that the first encrypted input comprising the first encrypted data $\bar{x}$ is smaller than the second encrypted input comprising the second encrypted data $\bar{y}$. It will be appreciated that the other three order comparisons (i.e., GT, LEQ and GEQ) can be derived from the method for determining the less-than comparison. It will also be appreciated that its complement, which is the greater-than-or-equal comparison ($GEQ(\bar{x}, \bar{y})$), can be obtained by taking $\bar{1}-LT(\bar{x}, \bar{y})$. Accordingly, it is possible to evaluate the greater-than comparison $GT(\bar{x}, \bar{y})$ by simply swapping the inputs to $LT(\bar{x}, \bar{y})$, i.e., $GT(\bar{x}, \bar{y}) = LT(\bar{x}, \bar{y})$.

In relation to encoding data, messages that can be expressed as binary strings of length up to $\ell$ may be considered, i.e., the set $\{0, 1\}^\ell$ with the usual lexicographic order, which can be evaluated with the Boolean circuits described by Cheon et al. (e.g., see Cheon et al., "Search-and-compute on encrypted data", In *FC* 2015 *Workshops*, volume 8976 of *LNCS*, pages 142-159, Springer, Heidelberg 2015). However, various example embodiments note that their methods require $\ell$ ciphertexts or $\ell$ slots in a ciphertext with SIMD techniques.

According to various example embodiments, for a plaintext space of $\mathbb{F}_{2^\omega}$ such that $\ell \leq \omega$, the string $s = (s_{\ell-1} \ldots s_1 s_0)$ may be encoded in $\mathbb{F}_{2^\omega}$. In this regard, various example embodiments provide a technique for encoding the string into a single field element in $\mathbb{F}_{2^\omega}$ in a manner that allows efficient order comparisons. In various example embodiments, an encoding map is used as follows:

$$\text{encode}: \mathcal{M} = \{0, 1\}^\ell \to \mathbb{F}_{2^\omega} \quad \text{(Equation 9)}$$

$$s = (s_{\ell-1} \ldots s_1 s_0) \mapsto \sum_{j=0}^{\ell-1} s_j t^j.$$

Accordingly, based on Equation (9), a string may be encoded into a single field element in a finite field, where the field element may be represented by a polynomial. In this regard, each bit may be encoded as a coefficient of the polynomial representing the field element. The induced order on $\mathbb{F}_{2^\omega}$ is the lexicographic order with respect to the powers of the indeterminate t.

Accordingly, in various example embodiments of the present invention, a binary string may be encoded as a single field element of a finite field using a linear map, such as described hereinbefore with reference to Lemma 3 and Equation (2). Furthermore, according to various example embodiments, the linear map may be evaluated using the Frobenius map provided by the homomorphic encryption scheme (e.g., using Equation (2)).

A Parameterized Algorithm for Order Comparisons for $\mathbb{F}_{2^\omega}$

First, an overview of a naive order comparison algorithm for $\mathbb{F}_{2^\omega}$ is described. By casting the order relations induced by the above-described encode function (Equation 9) over $\mathbb{F}_{2^\omega}$ into functions $LT_{\mathbb{F}_{2^\omega}}(x, y)$ and $GT_{\mathbb{F}_{2^\omega}}(x, y)$, Lagrange interpolation (Theorem 1) may be used to obtain bi-variate polynomial expressions, $g_{LT}(x, y)$ and $g_{GT}(x, y)$, that respectively evaluate those functions. Furthermore, with depth-free Frobenius map evaluation, the depth of these polynomial expressions are log log($2^\omega$+1)≈1+log ω which is quite manageable. However, various example embodiments note that evaluating $g_{LT}(x, y)$ and $g_{GT}(x, y)$ would be very inefficient as they would have up to $2^{2\omega}-1$ coefficients and therefore require about $O(2^{2\omega})$ multiplications.

An overview of a method (e.g., including corresponding algorithm) for determining an order of encrypted inputs according to various example embodiments of the present invention will now be described. Various example embodiments employ a vector space representation of $\mathbb{F}_{2^\omega}$ to obtain a more efficient method (or the corresponding algorithm). In this regard, according to various example embodiments, a co-bit representation (e.g., an encrypted data of a polynomial encoded from a data representation, as described hereinbefore according to various embodiments) may be broken down (e.g., segmented) into ω/r number of r-bit sized blocks (e.g., corresponding to a series of encrypted blocks, as described hereinbefore according to various embodiments) which live in a subspace $P_r = \{\Sigma_{i=0}^{r-1} a_i t^i | a_i \in \{0, 1\}\}$ of $\mathbb{F}_{2^\omega}$. Subsequently, these blocks may be evaluated with $LT_{P_r}$ and $EQ_{P_r}$ operations functions (e.g., corresponding to the "first block-wise operation" and the "second block-wise operation", respectively, as described hereinbefore according to various embodiments) that are defined only on elements in $P_r$. The result of the desired comparison (e.g., corresponding to the order of two encrypted data) may be reconstructed by combining the outputs of the above-mentioned block-wise operations or evaluations. For example, various example embodiments denote with $LT_{\mathbb{F}_2\omega, r}(x, y)$ the method (or the corresponding algorithm) that results from choosing r-bit sized blocks.

In relation to an extraction operation for segmenting an encrypted data into a series of encrypted blocks, for r≥1 such that r|ω, various example embodiments may define $\text{Extract}_r(x, k)$ for $x = \Sigma_{i=0}^{\omega-1} x_i t^i \in \mathbb{F}_{2^\ell}$ and $k \in \{0, \ldots, \omega/r - 1\}$ as follows:

$$\text{Extract}_r(x, k) = \sum_{i=0}^{r-1} x_{kr+i} t^i \quad \text{(Equation 10)}$$

It will be appreciated by a person skilled in the art that this extraction operation can be generalized easily to arbitrary-sized blocks.

According to various example embodiments, the extraction operation may correspond to a function that extracts the kr-th to (k+1)r−1-th coefficients of $x \in \mathbb{F}_{2^\omega}$, which is equivalent to the kr-th to (k+1)r−1-th components of the vector representation of $x \in (\mathbb{F}_2)^\omega$. In various example embodiments, the extraction operation, $\text{Extract}_r(x, k)$, may be performed in practice by finding an appropriate linear map $T_{r,k}$ with constants $\{\rho_{T_{r,k},0}, \rho_{T_{r,k},1}, \ldots, \rho_{T_{r,k},\omega-1}\}$ and applying Lemma 3 described hereinbefore with depth-free Frobenius map evaluations. Accordingly, for example, Equation (9) shows how an input bit string (e.g., a binary string) may be encoded into a field element, and Equation (10) shows how r-bit sized blocks (e.g., a series of encrypted blocks) may be extracted from the field element (e.g., an encrypted field element) into the subspace $P_r$, which may be implemented via linear maps based on Lemma 3.

In relation to functions on $P_r \times P_r$, functions that may be used for the block-wise comparisons, namely, a less-than comparison operation, a greater-than comparison operation and an equality comparison operation, according to various example embodiments, are provided below. For $x, y \in P_r$ and considering the inherited order, $<_{P_r}$, from $\mathbb{F}_{2^\omega}$, $$LT_{P_r}(x, y) = \begin{cases} 1, & \text{if } x <_{P_r} y; \\ 0, & \text{otherwise} \end{cases} \quad \text{(Equation 11)}$$

$$GT_{P_r}(x, y) = \begin{cases} 1, & \text{if } x <_{P_r} y; \\ 0, & \text{otherwise} \end{cases} \quad \text{(Equation 12)}$$

$$EQ_{P_r}(x, y) = \begin{cases} 1, & \text{if } x = y; \\ 0, & \text{otherwise} \end{cases} \quad \text{(Equation 13)}$$

In various example embodiments, to obtain a polynomial expression for functions defined on $P_r \times P_r$, the Lagrange interpolation (Theorem 1) procedure is modified to only consider elements in $P_r$ rather than the entire field $\mathbb{F}_{2^\omega}$. The polynomial expressions obtained will have degree at most $2^r$ and can be evaluated at log r depth with depth-free Frobenius map evaluation and $O(2^{2r})$ multiplications.

Figure 6A:
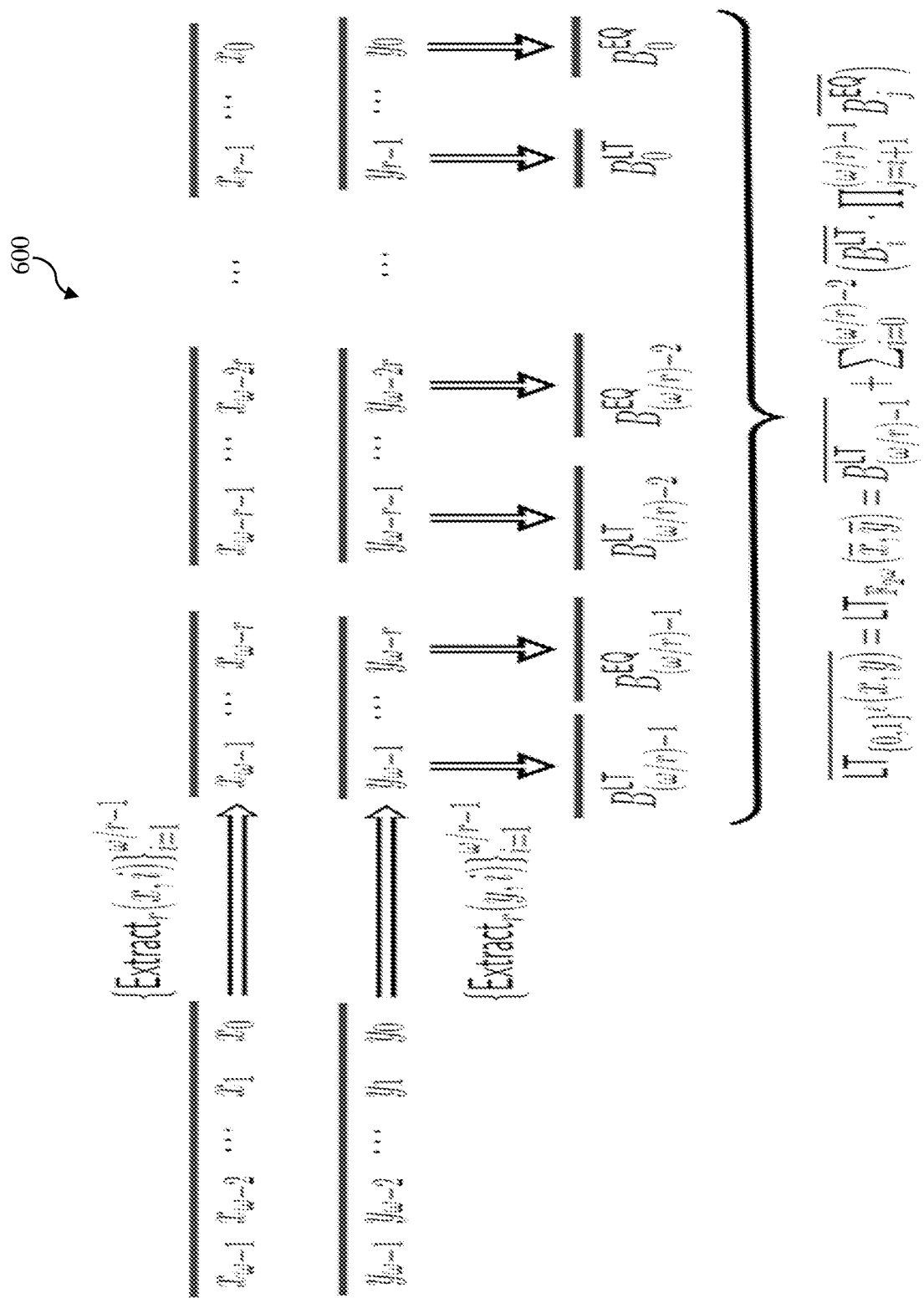
FIG. 6A depicts a schematic drawing showing a visual representation of an example method of determining an order of encrypted inputs, according to various example embodiments of the present invention.

With various components introduced, a method 600 (e.g., including corresponding algorithm) of determining an order of encrypted inputs (each encrypted input including an encrypted data) based on a less-than comparison on $\mathbb{F}_{2^\omega}$, for $LT_{\mathbb{F}_{2^\omega}}(\bar{x}, \bar{y})$ for $x, y \in \mathbb{F}_{2^\omega}$ will now be described below, according to various example embodiments. In this regard, FIG. 6A depicts a schematic drawing showing a visual representation of the method 600. For r≤1 such that r|ω and two encrypted data (two ciphertexts) $\bar{x}, \bar{y}$ where $x = \Sigma_{i=0}^{\omega-1} x_i t^i$, $y = \Sigma_{i=0}^{\omega-1} y_i t^i$, the method 600 includes:

1. Extraction: Compute the blocks $(\overline{B_0^x}, \ldots, \overline{B_{\omega/r-1}^x})$, $(\overline{B_0^y}, \ldots, \overline{B_{\omega/r-1}^y}) \in (P_r)^{\omega/r}$ where $B_i^\alpha = \Sigma_{j=(i-1)r}^{ir} \alpha_j t^j = \text{Extract}_{P_r}(\alpha, i)$ with $\alpha \in \{x, y\}$.

2. Block-wise Comparisons: Compute $(\overline{B_0^{EQ}}, \ldots, \overline{B_{\omega/r-1}^{EQ}})(\overline{B_0^{LT}}, \ldots, \overline{B_{\omega/r-1}^{LT}}) \in (\mathbb{F}_2)^{\omega/r}$, where $B_i^\beta = \beta_{P_r}(B_i^x, B_i^y)$ for $\beta \in \{EQ, LT\}$.

3. Reconstruction: $\overline{LT_{\mathbb{F}_{2^\omega}}(x, y)} = \overline{B_{\omega/r-1}^{LT}} + \Sigma_{j=0}^{\omega/r-2} \overline{B_j^{LT}} \Pi_{i=j+1}^{\omega/r-1} \overline{B_i^{EQ}}$.

According to various example embodiments, the method 600 may be seen as an extension of the Boolean circuit for $LT_{\{0,1\}^\omega}$ to $LT_{(P_r)^{\omega/r}}$ with arithmetic gates in $\mathbb{F}_{2^\omega}$.

According to various example embodiments, a key observation for a≤b is that, for two plaintexts x=encode(a), y=encode(b)∈ $\mathbb{F}_{2^\omega}$ and block size r, 1. if the first block of x, $B_{\omega/r-1}^{x=[x_{\omega-r}, \ldots, x_{\omega-1}]}$ is smaller than the first block of y, $B_{\omega/r-1}^{y=[y_{\omega-r}, \ldots, y_{\omega-1}]}$, then x<y and correspondingly a<b;

2. for 0≤j≤ω/r−2 if the j-th block of x, $B_j^x$ is smaller than that of y, $B_j^y$, and all more significant blocks of x, $\{B_i^x\}_{i=j+1}^{\omega/r-1}$, are equal to their corresponding blocks of y, $\{B_i^y\}_{i=j+1}^{\omega/r-1}$, then for similar reasons, a<b;

3. otherwise, a≥b.

According to various example embodiments, since each original message (e.g., an original plaintext or unencrypted data) is encoded into a single field element, the above-mentioned extraction step may be used on the encrypted field element to obtain the corresponding series of encrypted blocks. Subsequently, the above-mentioned block-wise comparison operations (e.g., the less-than comparison operation and the equality comparison operation) may be performed, where functions on the blocks (encrypted blocks) are evaluated. In various example embodiments, the less-than comparison function $EQ_{P_r}(B^x, B^y)$ and the more-than comparison $LT_{P_r}(B^x, B^y)$ may output '1' if the two blocks $B^x$, $B^y \in P_r$ are equal or $B^x < B^y$ in the inherited order from $\mathbb{F}_{2^\omega}$ and may output '0' otherwise. With correct extraction, the results of the function will be correct as well, that is, $$B_j^{EQ} = \begin{cases} 1, & \text{if } B_j^x = B_j^y; \text{ and} \\ 0, & \text{otherwise} \end{cases} \quad \text{(Equation 14)}$$

$$B_j^{LT} = \begin{cases} 1, & \text{if } B_j^x <_{P_r} B_j^y; \text{ and} \\ 0, & \text{otherwise} \end{cases} \quad \text{(Equation 15)}$$

Then, results of these functions on the blocks may be combined to obtain a combined result (which in this example is the final result) using the following formula:

$$LT_{\mathbb{F}_{2^\omega}}(x, y) = B_{\omega/r-1}^{LT} + \sum_{j=0}^{\omega/r-2} B_j^{LT} \prod_{i=j+1}^{\omega/r-1} B_i^{EQ} \quad \text{(Equation 16)}$$

For example, Equation (16) expresses the following logic,
1. $B_{\omega/r-1}^{LT}$ indicates if the first block of x, $B_{\omega/r-1}^x$, is less than the same y, $B_{\omega/r-1}^y$;
2. for $0 \leq j \leq \omega/r-2$, the term $B_j^{LT}\prod_{i=j+1}^{\omega/r-1} B_i^{EQ}$ indicates if the j-th block of x is less than y and all more significant blocks are equal.

For example, since the conditions of each term are disjoint, a simple sum of the results of the above-mentioned functions on the blocks is sufficient to obtain the final result.

Figure 6B:
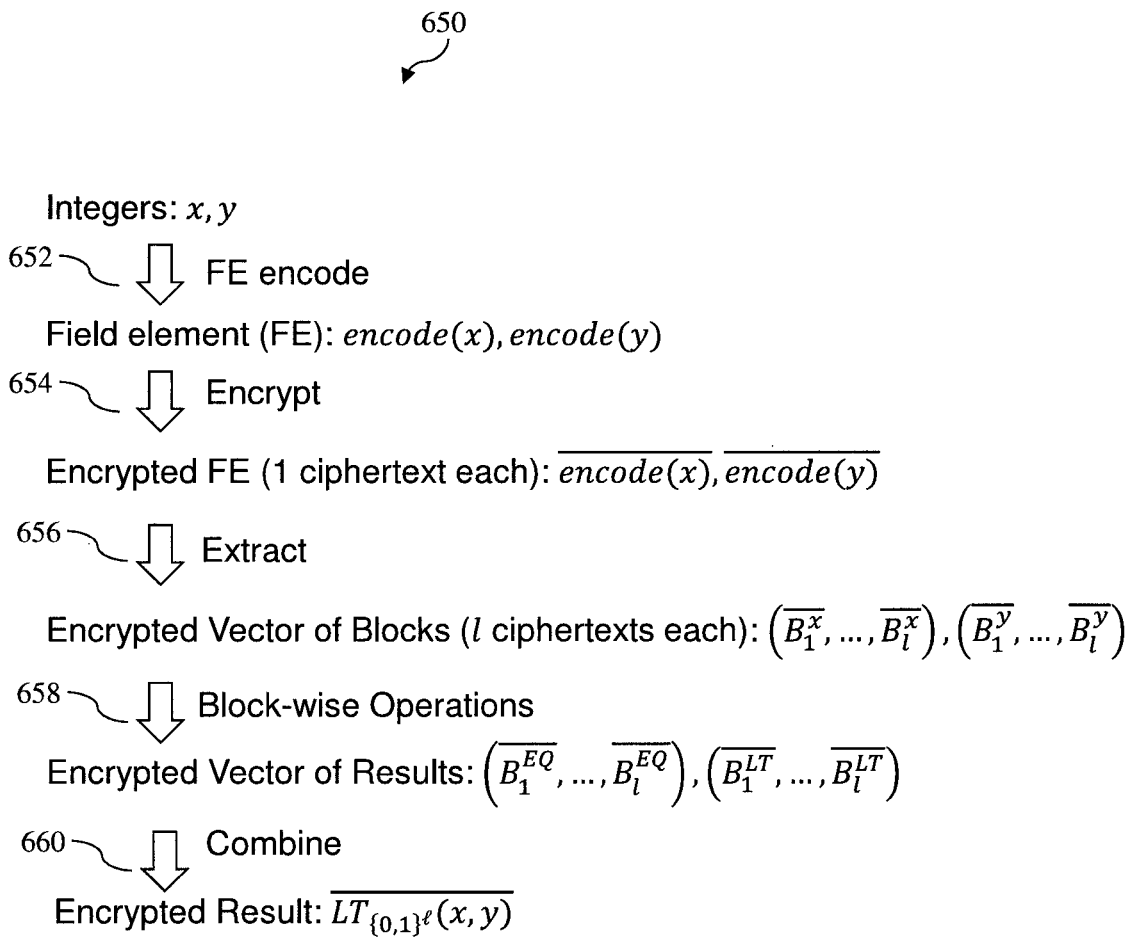
FIG. 6B depicts a a flow diagram illustrating an overview of a method of determining an order of encrypted inputs, corresponding to the method of FIG. 6A, including steps for encoding original data into encrypted data, according to various example embodiments of the present invention.

FIG. 6B depicts a flow diagram illustrating an overview of a method 650 of determining an order of encrypted inputs (corresponding to the method 600 as described with reference to FIG. 6A) including steps for encoding original data into encrypted data, according to various example embodiments of the present invention. The method 650 comprises: encoding (at 652) each of a first data (e.g., first original plaintext or unencrypted data) and a second data (e.g., second original plaintext or unencrypted data) into a field element of a finite field to obtain a first field element and a second field element; encrypting (at 654) each of the first field element and the second field element using a homomorphic encryption scheme into a first encrypted data (first ciphertext) and a second encrypted data (second ciphertext), respectively; extracting (at 656) the first encrypted data and the second encrypted data (e.g., using the extraction function as described hereinbefore according to various example embodiments) into a first series (or vector) of encrypted blocks and a second series (or vector) of encrypted blocks, respectively; performing (at 658) block-wise operations (e.g., the first block-wise operations (or the less-than block-wise comparison operation) and the second block-wise operation (or the equality block-wise comparison operation) as described hereinbefore according to various example embodiments) between the first series of encrypted blocks and the second series of encrypted blocks to obtain respective series (or vector) of block-wise outputs (or results); and combining (at 660) the multiple series of block-wise outputs to obtain a result indicating the determined order of the first and second encrypted data.

In various embodiments, steps involved in processing of the original data to obtain the corresponding encrypted data may be performed at a client or user side, and steps involved in processing of such encrypted data (e.g., first and second encrypted data) to determine an order of such encrypted data according to various example embodiments as described herein may be performed at a server side. For example, in relation to the method 650 of FIG. 6B, steps 652 and 654 may be performed at the client or user side, such as on a client device/system (or user device/system) to obtain encrypted data for transmission to the server (e.g., a first client device may generate the first and second encrypted data, or a first client device may generate the first encrypted data and a second client device may generate the second encrypted data), and steps 656, 658 and 660 may be performed at the server side, such as on a server (e.g., computational or database server) configured to perform the method of determining an order of encrypted inputs, including the first and second encrypted data (e.g., whether the first encrypted data is less than the second encrypted data received) as described herein according to various example embodiments. For example, the first and second encrypted data may both be stored at the server, one of the first and second encrypted data may be stored at the server and the other one of the first and second encrypted data may be received from the client side as a query input to the server, or both of the first and second encrypted data may be received from the client side as query inputs to the server.

By way of an example only and without limitations, based on the method 650 as described above with reference to FIG. 6B, steps involved in determining an order of encrypted inputs, namely, between a first encrypted input including a first encrypted data corresponding to a first integer '15' and a second encrypted input including a second encrypted data corresponding to a second integer '13', will now be described, with respect to whether the first encrypted data is less than the second encrypted data. The first and second integers ('15' and '13') may be represented as 4-bit strings '1111' and '1101', respectively. First, the first encrypted data and the second encrypted data may be encoded into a first field element and a second field element, respectively. In this example, the binary string '1111' may be encoded to $t^3+t^2+t+1$ and the binary string '1100' may be encoded to $t^3+t^2+1$. The first and second field elements may then be encrypted based on a fully homomorphic encryption scheme to a first and second encrypted data (or first and second encrypted field elements), respectively, for example, $\overline{t^3+t^2+t+1}$ and $\overline{t^3+t^2+1}$. A method of determining an order of encrypted inputs as described hereinbefore according to various embodiments may then be performed on such encrypted data (i.e., the first and second encrypted data). In this regard, according to the method, the first and second encrypted field elements may each be broken down or converted into a series of encrypted blocks, using an extraction function (e.g., the above-mentioned extraction function described with reference to Equation (10)), to obtain a first series of encrypted blocks and a second series of encrypted blocks, respectively. In this example, the first encrypted data $\overline{t^3+t^2+t+1}$ may be converted to $(\overline{t+1}, \overline{t+1})$ (that is, two encrypted blocks, each encrypted block being a two-bit block), while the second encrypted data $\overline{t^3+t^2+t+1}$ may be converted to $(\overline{t+1}, \overline{1})$ (that is, two encrypted blocks, each encrypted block being a two-bit block). Block-wise operations may then be performed on the first and second series of encrypted blocks. In this regard, a first block-wise operation may be performed on the first and second series of encrypted blocks to obtain a first series of block-wise outputs. In this example, $(\overline{0}, \overline{0})$ may be obtained for a less-than block-wise comparison operation and $(\overline{1}, \overline{0})$ may be obtained for an equality block-wise comparison operation. Finally, a final result (encrypted result) of the method may be obtained by applying Equation (16). In this example, a final result may be obtained as $\overline{LT(15,13)} = \overline{0} + \overline{1} \cdot \overline{0} = \overline{0}$, which indicates that the first encrypted data is not less than the second encrypted data, which is as expected since the first integer '15' is not less than the second integer '13'.

Efficient Comparisons on Encrypted Data With $\mathbb{F}_{2^\omega}$ (Hybrid)

Another method 700 (e.g., including corresponding algorithm) for determining an order of encrypted inputs will now be described according to various example embodiments. In this regard, as an example, how to compare encrypted binary strings of arbitrary length $\ell$, $\{0,1\}^\ell$ using FHE with plaintext space $\mathbb{F}_{2^\omega}$ will be described. According to various example embodiments, for a plaintext space of $\mathbb{F}_{2^\omega}$ such that $\omega \leq \ell$, the string $s = (s_{\ell-1} \ldots s_1 s_0)$ may be divided into blocks of length $\rho \leq \omega$, $s = (K_{q-1} \| \ldots \| K_1 \| K_0)$, where $K = (s_{(i+1)\cdot\rho - 1} \ldots s_{i\cdot\rho})$ and $q = \lceil \ell/\rho \rceil$. As a result, only q ciphertexts or slots is needed instead of $\ell$, thereby reducing the size overhead by a factor of $\rho$. In various example embodiments, the string is broken down into $\rho$-sized blocks, with $\rho \leq \omega$ and the algorithm $LT_{2^\omega}$ is used for $P_\rho \subseteq \mathbb{F}_{2^\omega}$ and a particular block size parameter r. This method 700 may be seen as a hybrid of the optimized Boolean circuit technique and the finite field order comparison method as described hereinbefore with reference to FIG. 6A, where a vector of field elements (corresponding to a series of encrypted blocks) is encrypted as opposed to a vector of bits. Optimized SIMD vector operations may then be used to evaluate the order comparison $LT_{\{0,1\}^\ell}(x, y)$.

$$encode': \{0,1\}^\ell \to (\mathbb{F}_{2^\omega})^q \quad \text{(Equation 17)}$$

$$(s_{\ell-1} s_{\ell-2} \ldots s_0) \mapsto (K_{q-1}, K_{q-2}, \ldots, K_0)$$

where $K_i = encode(s_{(i+1)\rho - 1} s_{(i+1)\rho - 2} \ldots s_{i\rho})$.

Accordingly, based on Equation (17), a string may be encoded into a vector of finite field elements (corresponding to a series of blocks or a series of field elements), instead of a single field element according to Equation (9). Accordingly, the input string of length $\ell \geq \omega$ may be partitioned into a series of blocks of length $\rho$ such that $\rho \leq \omega$. Since each block is of length at most $\omega$, each string block may then be encoded to an element of $\mathbb{F}_{2^\omega}$, resulting in a vector of finite field elements from the input string.

Figure 7A:
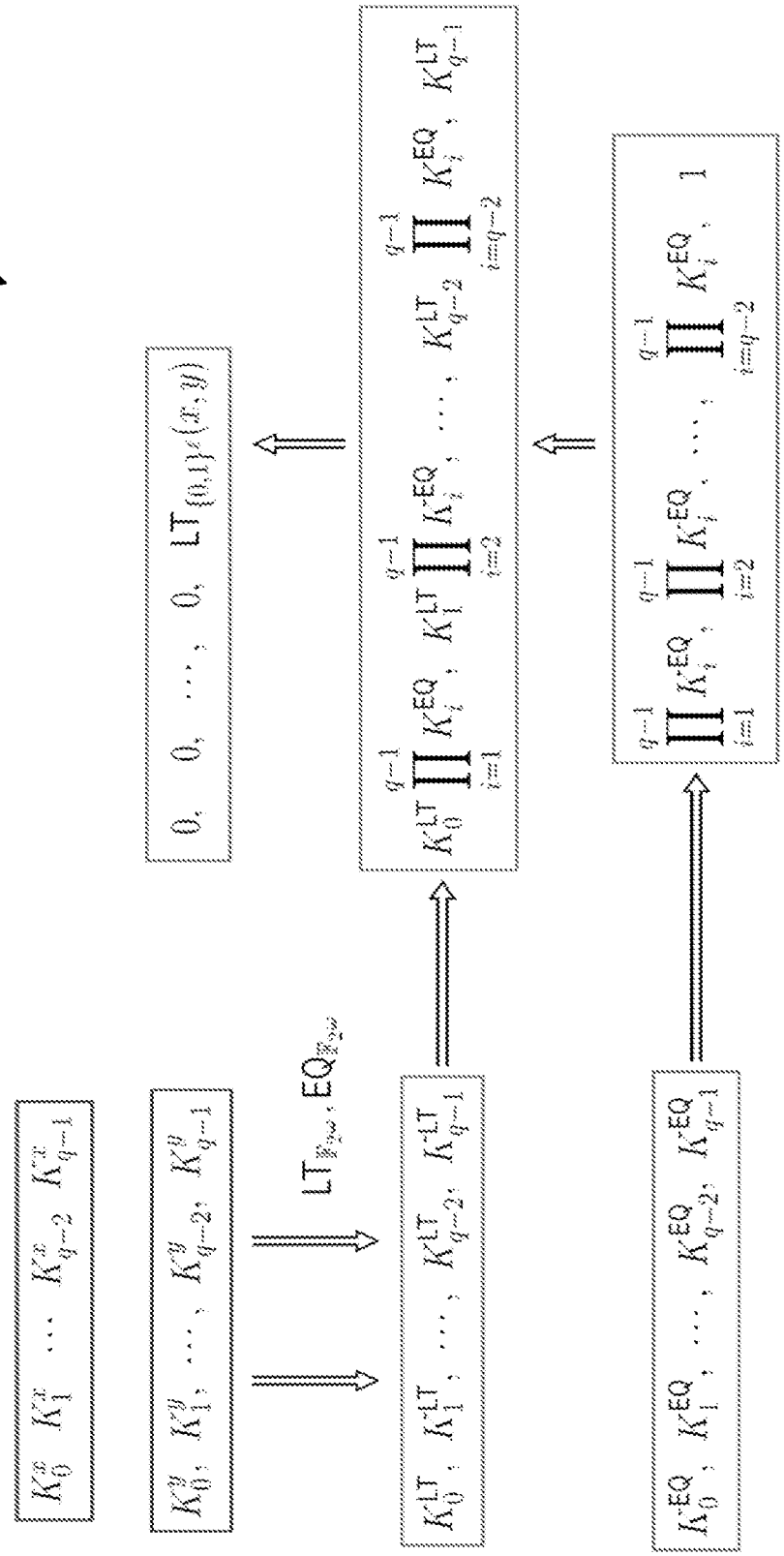
FIG. 7A depicts a schematic drawing showing a visual representation of another method of determining an order of encrypted inputs, according to various example embodiments of the present invention.

FIG. 7A depicts a schematic drawing showing a visual representation of the method 700 of determining an order of encrypted inputs according to various example embodiments. In various example embodiments, a string ($s \in \{0,1\}^\ell$) (e.g., corresponding to an original plaintext or unencrypted data) may be broken down (or segmented) into a series of blocks (e.g., $q = \lceil \ell/\rho \rceil$ blocks of size $\rho \leq \omega$. This may be carried out by grouping consecutive bits of s into $\rho$-length blocks, leaving the last ($\ell$ mod $\rho$) number of bits in one final block. In this case, according to various example embodiments, it is not required that $\rho | \ell$ but $\rho$ may be chosen or determined such that the smallest possible number of roughly similar-sized blocks is obtained. For example, in various example embodiments, $\rho$ may be chosen or determined to satisfy the following constraints:
$q = \lceil \ell/\rho \rceil = \lceil \ell/\omega \rceil$, i.e., yields the least number of blocks;
$\rho - \lceil \ell/\rho \rceil \leq \ell \mod \rho \leq \rho$, i.e., bits cannot be more evenly distributed among the blocks.

Each block in the series of blocks may then be encoded into an element of a finite field, to obtain a series of encoded blocks, each encoded block comprising the corresponding element. The series of encoded block may then be encrypted to produce an encrypted data (e.g., a single ciphertext) comprising a series of encrypted blocks (e.g., corresponding to the first encrypted data comprising a third series of encrypted blocks and the second encrypted data comprising a fourth series of encrypted blocks, as described herein according to various embodiments).

Let $\bar{x} = (K_0^x, \ldots, K_{q-1}^x)$ and $\bar{y} = (K_0^y, \ldots, K_{q-1}^y)$ denote a first encrypted data and a second encrypted data obtained from a first input string and a second input string, respectively, processed as described above. The method 700 of determining an order of encrypted inputs may then be performed on such encrypted data (i.e., the first and second encrypted data) according to various example embodiments, such as with respect to determining whether the first encrypted data is less than the second encrypted data $LT_{\{0,1\}^\ell}(\bar{x}, \bar{y})$ as follows and as illustrated in FIG. 7A:

1. Run the less-than comparison algorithm on $\mathbb{F}_{2^\omega}$, that is $LT_{\mathbb{F}_{2^\omega}}$, such as described hereinbefore with reference to FIGS. 6A and 6B, with some chosen block size $r | \omega$, with input $\overline{(K_0^x, \ldots, K_{q-1}^x)}$ and the y counterpart $\overline{(K_0^y, \ldots, K_{q-1}^y)}$, to obtain $\overline{(K_0^{LT}, \ldots, K_{q-1}^{LT})}$ for example, based on the following extraction operation, block-wise comparison operations and reconstruction operation (which correspond to the extraction operation, the block-wise comparison operations and the reconstruction operation as described hereinbefore with reference to FIG. 6A):

a. Extraction: Compute $$\left(B_0^{K_0^x}, \ldots, B_0^{K_{q-1}^x}\right), \ldots, \left(B_{\lceil \omega/r \rceil - 1}^{K_0^x}, \ldots, B_{\lceil \omega/r \rceil - 1}^{K_{q-1}^x}\right)$$

(e.g., corresponding to generating a plurality of first series of encrypted blocks from the first encrypted data (comprising the third series of encrypted blocks) described hereinbefore) and $$\left(B_0^{K_0^y}, \ldots, B_0^{K_{q-1}^y}\right), \ldots, \left(B_{\lceil \omega/r \rceil - 1}^{K_0^y}, \ldots, B_{\lceil \omega/r \rceil - 1}^{K_{q-1}^y}\right)$$

(e.g., corresponding to generating a plurality of second series of encrypted blocks from the second encrypted data (comprising the fourth series of encrypted blocks) described hereinbefore).

b. Block-wise Comparisons: Compute second-level block-wise equality and less-than comparison results:

$$\overline{(B_{0,0}^{EQ}, \ldots, B_{0,q-1}^{EQ})}, \ldots,$$

$$\overline{\left(B_{\lceil \frac{\omega}{r} \rceil - 1, 0}^{EQ}, \ldots, B_{\lceil \frac{\omega}{r} \rceil - 1, q-1}^{EQ}\right)} \overline{(B_{0,0}^{LT}, \ldots, B_{0,q-1}^{LT})}, \ldots,$$

$$\overline{\left(B_{\lceil \frac{\omega}{r} \rceil - 1, 0}^{LT}, \ldots, B_{\lceil \frac{\omega}{r} \rceil - 1, q-1}^{LT}\right)},$$

where $$B_{i,j}^\beta = \beta\left(B_i^{K_j^x}, B_i^{K_j^y}\right) \text{ for } \beta \in \{EQ, LT\}$$

and $0 \leq i \leq \lceil \frac{\omega}{r} \rceil - 1$ and $0 \leq j \leq q - 1$.

For example, the less-than block-wise comparison result may involve performing, for each of the plurality of first series of encrypted blocks, the first block-wise operation (less-than block-wise comparison operation) between the first series of encrypted blocks and the corresponding series of encrypted blocks of the plurality of second series of encrypted blocks to obtain a corresponding first series of block-wise outputs (e.g., each as shown above), as described hereinbefore according to various embodiments. For example, the equality block-wise comparison result may involve performing, for each of the plurality of first series of encrypted blocks, the second block-wise operation (equality block-wise comparison operation) between the first series of encrypted blocks and the corresponding series of encrypted blocks of the plurality of second series of encrypted blocks to obtain a corresponding second series of block-wise outputs (e.g., each as shown above), as described hereinbefore according to various embodiments.

c. Reconstruction: Compute a first-level block-wise comparison result with slot-wise additions and multiplications:

$$\overline{(K_0^{LT}, \ldots, K_q^{LT})} = \overline{(B_{\lceil \omega/r \rceil - 1, 0}^{LT}, \ldots, B_{\lceil \omega/r \rceil - 1, q}^{LT})} + \sum_{i=0}^{\lceil \omega/r \rceil - 2} \overline{(B_{\lceil \omega/r \rceil - 1, 0}^{LT}, \ldots, B_{\lceil \omega/r \rceil - 1, q}^{LT})} \prod_{j=i+1}^{\lceil \omega/r \rceil - 1} \overline{(B_{j,0}^{EQ}, \ldots, B_{j,q}^{EQ})}.$$

2. Run an equality comparison algorithm, $EQ_{\mathbb{F}_{2^\omega}}$ (e.g., see Kim et al., "On the efficiency of FHE-based private queries", *IEEE Trans. Dependable and Secure Computing*, Vol. 15, Issue 2, March-April 2018 and Kim et al., "Better security for queries on encrypted databases", Cryptology ePrint Archive, Report 2016/470, 2016) to determine if the pairs of blocks from x and y are equal, obtaining $\overline{(K_0^{EQ}, \ldots, K_{q-1}^{EQ})}$.

3. Combining results: combine the results of the less-than comparison algorithm $LT_{\mathbb{F}_{2^\omega}}$ and the equality comparison algorithm $EQ_{\mathbb{F}_{2^\omega}}$ to compute the result as follows:

a. Use $\lceil \log q \rceil$ shift-and-multiply's to compute the products:

$$\overline{\left( \prod_{j=1}^{q-1} K_j^{EQ}, \prod_{j=2}^{q-1} K_j^{EQ}, \ldots, K_{q-2}^{EQ} \cdot K_{q-1}^{EQ}, 1 \right)}.$$

b. Compute the contribution of each block to the final comparison result:

$$\overline{\left( K_0^{LT} \prod_{j=1}^{q-1} K_j^{EQ}, K_1^{LT} \prod_{j=2}^{q-1} K_j^{EQ}, \ldots, K_{q-2}^{LT} \cdot K_{q-2}^{EQ} \cdot K_{q-1}^{EQ}, K_{q-1}^{LT} \right)},$$

with one multiplication.

c. Use $\lceil \log q \rceil$ shift-and-adds to compute the result:

$$\overline{\left( 0, \ldots, 0, LT_{\{0,1\}^\ell}(x, y) = K_{q-1}^{LT} + \sum_{i=0}^{q-1} K_i^{LT} \cdot \prod_{j=i+1}^{q-2} K_j^{EQ} \right)}.$$

Figure 7B:
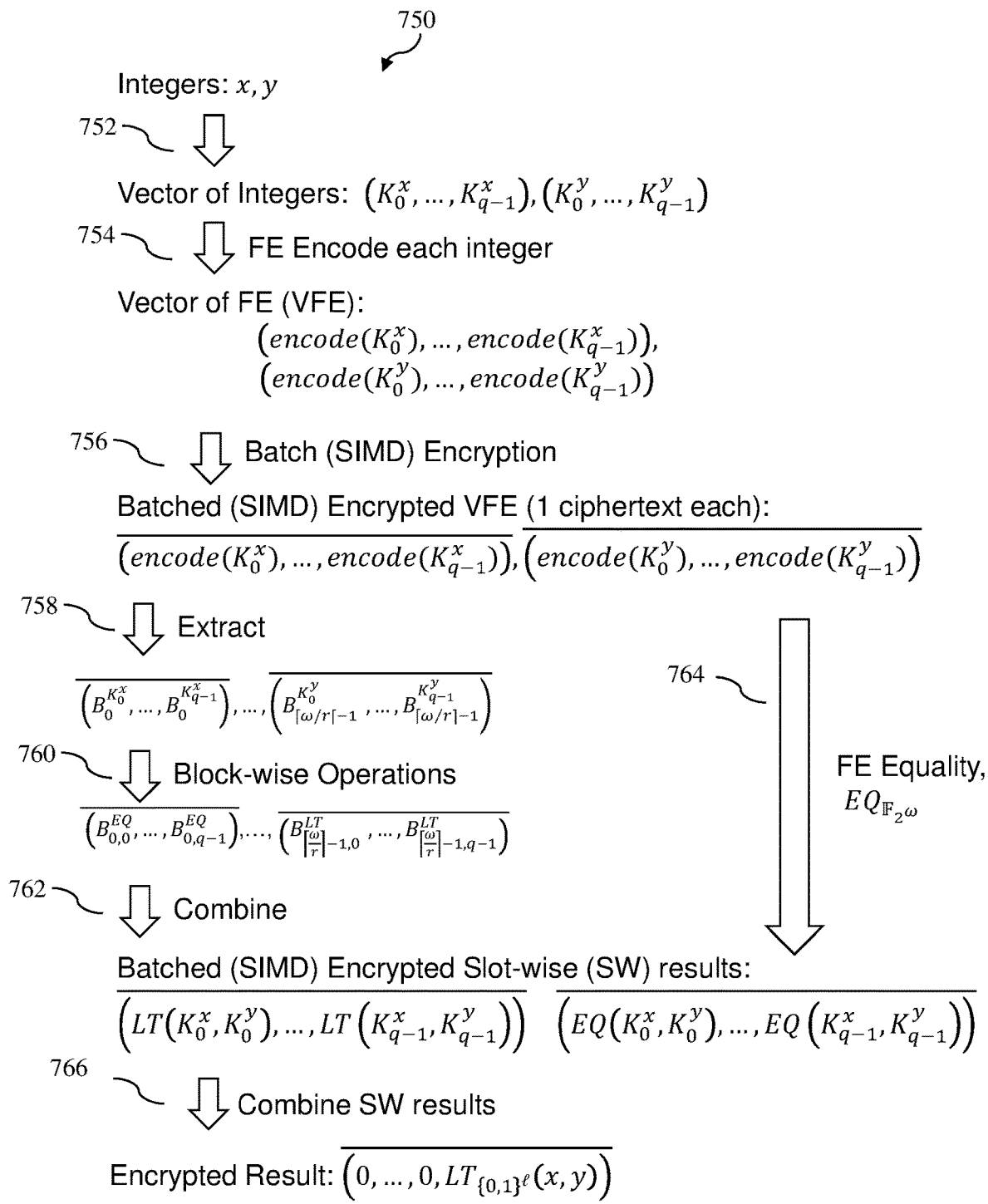
FIG. 7B depicts a flow diagram illustrating an overview of a method of determining an order of encrypted inputs, corresponding to the method of FIG. 7A, including steps for encoding original data into encrypted data, according to various example embodiments of the present invention.

FIG. 7B depicts a flow diagram illustrating an overview of a method 750 of determining an order of encrypted inputs (corresponding to the method 700 as described with reference to FIG. 7A) including steps for encoding original data into encrypted data, according to various example embodiments of the present invention. The method 750 comprises: segmenting (at 752) each of a first data (e.g., first original plaintext or unencrypted data) and a second data (e.g., second original plaintext or unencrypted data) into a first series of blocks and a second series of blocks, respectively; encoding (at 754) each block of the first series of blocks and each block of the second series of blocks into an element of a finite field to obtain a first series of encoded blocks and a second series of encoded blocks (accordingly, each encoded block in the first series of encoded blocks and each encoded block in the second series of encoded blocks comprising the corresponding element); encrypting (at 756) the first and second series of encoded blocks using a homomorphic encryption scheme to obtain first and second encrypted data (the first encrypted data comprising a third series of encrypted blocks and the second encrypted data comprising a fourth series of encrypted blocks); extracting (at 758) the first encrypted data and the second encrypted data (e.g., using the extraction function as described hereinbefore according to various example embodiments) into a plurality of first series (or vector) of encrypted blocks from the first encrypted data and a plurality of second series (or vector) of encrypted blocks from the second encrypted data, respectively; performing (at 760), for each of the plurality of first series of encrypted blocks, a first block-wise operation (the less-than block-wise comparison operation) between the first series of encrypted blocks and the corresponding series of encrypted blocks of the plurality of second series of encrypted blocks (that is, for each pair of corresponding series of encrypted blocks in the plurality of first series of encrypted blocks and the plurality of second series of encrypted blocks) to obtain a corresponding first series of block-wise outputs (thereby obtaining a plurality of first series of block-wise outputs); performing (also at 760), for each of the plurality of first series of encrypted blocks, a second block-wise operation (the equality block-wise comparison operation) between the first series of encrypted blocks and the corresponding series of encrypted blocks of the plurality of second series of encrypted blocks (for each pair of corresponding series of encrypted blocks in the plurality of first series of encrypted blocks and the plurality of second series of encrypted blocks) to obtain a corresponding second series of block-wise outputs (thereby obtaining a plurality of second series of block-wise outputs); combining (at 762) the plurality of first series of block-wise outputs and a plurality of second series of block-wise outputs, respectively, to obtain a series of combined results (e.g., in a manner as described in the reconstruction step described hereinbefore with reference to FIG. 6A or 7A); performing (at 764), an equality operation on the first encrypted data and the second encrypted data for determining whether each corresponding pair of encrypted blocks in the first encrypted data (comprising the third series of encrypted blocks) and the second encrypted data (comprising the fourth series of encrypted blocks) is equal (e.g., in a manner as described in the equality comparison algorithm ($EQ_{\mathbb{F}_{2^\omega}}$) described hereinbefore with reference to FIG. 7A) to obtain a series of equality results (that is, an equality result for each corresponding pair of encrypted blocks); and combining (at 766) the series of combined results and the series of equality results to obtain a result indicating the determined order of the first and second encrypted data (e.g., in a manner as described in the step of combining results as described hereinbefore with reference to FIG. 7A).

In various embodiments, steps involved in processing of the original data to obtain the corresponding encrypted data may be performed at a client or user side, and steps involved in processing of such encrypted data (e.g., first and second encrypted data) to determine an order of such encrypted data according to various example embodiments as described herein may be performed at a server side. For example, in relation to the method 750 of FIG. 7B, steps 752, 754 and 756 may be performed at the client or user side, such as on a client device/system (or user device/system) to obtain encrypted data for transmission to the server (e.g., a first client device may generate the first and second encrypted data, or a first client device may generate the first encrypted data and a second client device may generate the second encrypted data), and steps 758, 760, 762, 764, 766 may be performed at the server side, such as on a server (e.g., computational or database server) configured to perform the method of determining an order of encrypted inputs, including the first and second encrypted data (e.g., whether the first encrypted data is less than the second encrypted data received) as described herein according to various example embodiments. For example, the first and second encrypted data may both be stored at the server, one of the first and second encrypted data may be stored at the server and the other one of the first and second encrypted data may be received from the client side as a query input to the server, or both of the first and second encrypted data may be received from the client side as query inputs to the server.

By way of an example only and without limitations, based on the method 750, as described above with reference to FIG. 7B, steps involved in determining an order of encrypted inputs namely, between a first encrypted input including a first encrypted data corresponding to a first integer '141' and a second encrypted input including a second encrypted data corresponding to a second integer '219', will now be described, with respect to whether the first encrypted data is less than the second encrypted data. The first and second integers ('141' and '219') may be represented as 8-bit strings '1000 1101' and '1101 1011', respectively, but may only have access to $\mathbb{F}_{2^4}$ as the plaintext space. First, the first and second integers may each be partitioned (or segmented) into smaller blocks of strings to obtain first and second series of blocks, and each block in the first and second series of blocks may then be encoded based on Equation (9) to obtain first and second series of encoded blocks, respectively. Accordingly, in this example, the first and second integers may each be segmented into two blocks of 4 bits, thereby obtaining (1000, 1101) and (1101,1011), respectively, which may then be encoded and encrypted into first and second encrypted data (the first and second encrypted data each being a single ciphertext) as $\overline{(t^3,t^3+t^2+1)}$ (e.g., corresponding to a third series of encrypted blocks) and $\overline{(t^3+t^2+1,t^3+t+1)}$ (e.g., corresponding to a fourth series of encrypted blocks), respectively. A method of determining an order of encrypted inputs as described hereinbefore according to various embodiments may then be performed on such encrypted data (i.e., the first and second encrypted data). In this regard, according to the method, the extraction operation may be performed on the first encrypted data and the second encrypted data and then the block-wise operations may be performed, such as in a similar or corresponding manner as described hereinbefore with reference to FIG. 6A. In this example, in relation to the extraction operation, a plurality of first series of encrypted blocks $\overline{((t,t+1)}, \overline{(0,1))}$ may be extracted from the first encrypted data $\overline{(t^3,t^3+t^2+1)}$ and a plurality of second series of encrypted blocks $\overline{((t+1,t)},$ $\overline{(1,t+1))}$ may be extracted from the second encrypted data $\overline{(t^3+t^2+1,t^3+t+1)}$. In relation to the block-wise operations, for each pair of corresponding series of encrypted blocks in the plurality of first series of encrypted blocks and the plurality of second series of encrypted blocks, a less-than block-wise comparison operation may be performed between the pair of corresponding series of encrypted blocks to obtain $(\overline{(1,0)},$ $\overline{(1,1)})$, and an equality block-wise comparison operation may be performed between the pair of corresponding series of encrypted blocks to obtain $(\overline{(0,0)}, \overline{(0,0)})$. Then, the reconstruction result may be obtained, such as in a manner as described in the reconstruction step described with reference to FIG. 7A. In this example, $(\overline{(1,0)})$ may be obtained as the reconstruction result. Besides that, $(\overline{(0,0)})$ may be obtained for the equality operation ($EQ_{\mathbb{F}_{2^\omega}}$) on $\overline{(t^3,t^3+t^2+1)}$ and $\overline{(t^3+t^2+1,t^3+t+1)}$. Finally, a final result (encrypted result) of the method 750 may be obtained by combining the results of the less-than comparison operation and the equality comparison operation such as in a manner as described hereinbefore with reference to FIG. 7A. In this example, a final result may be obtained as $\overline{(0,LT(141,219)}=\overline{1+0\cdot 0})$, which indicates that the first encrypted data is not less than the second encrypted data, which is as expected since the first integer '141' is not less than the second integer '219'.

For example, the method 700 advantageously allows more flexibility with respect to FEE parameter choices and computation/space trade-offs.

According to various example embodiments, to support ternary operators such as (x<y)?x:0, a function fillSlots is introduced that replicates the result of $LT_{\{0,1\}^\ell}$ (x, y) over the q slots that would contain the data $\bar{x}$. In this regard, $\lceil \log q \rceil$ shift-and-adds may be performed to propagate the result of $LT_{\{0,1\}^\ell}$ (x, y) over the required slots.

As an example application, by way of an example and without limitation, a private database query (PDQ) protocol was implemented that returns the value of any database record whose key is less than the encrypted query, and will be described below. This is an example application to demonstrate how the method of determining an order of encrypted inputs may be used to support secure database outsourcing in the semi-honest model, and it will be appreciated by a person skilled in the art that the present invention is not limited to such an example application.

In the PDQ protocol, it is assumed that a client wishes to securely outsource the client's database $\mathcal{D}=\{\alpha_i=(\alpha_i.\text{v}, \alpha_i.\text{k}) \in \{0,1\}^\ell \times \{0,1\}^\ell\}$ to an honest-but-curious cloud and wishes to be able to retrieve values/records ($\alpha_i.\text{v}$ or $\alpha_i$) whose keys, $\alpha_i.\text{k}$, satisfy certain conditions. Most importantly, the client desires privacy for their outsourced database and queries and does not allow the cloud or any other parties to gain partial information about the database or queries sent by the client. All parties faithfully follow the protocol described but may try to gleam additional information besides the result of the protocol from transcripts from executing the protocol. For simplicity, only the condition $\alpha_i.\text{k}<\theta$ is considered but it will be appreciated that this can be extended to more complex queries and multiple keys with techniques from Kim et al. (e.g., see Kim et al., "On the efficiency of FEE-based private queries", *IEEE Trans. Dependable and Secure Computing*, Vol. 15, Issue 2, March-April 2018 and Kim et al., "Better security for queries on encrypted databases", Cryptology ePrint Archive, Report 2016/470, 2016).

Figure 8:
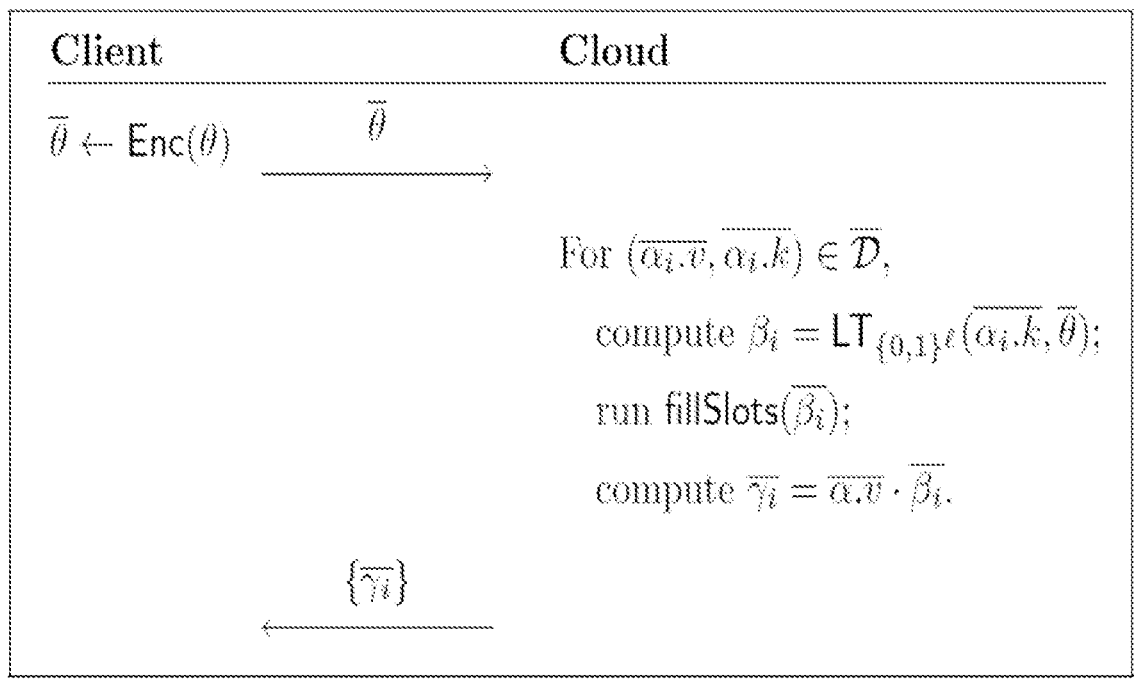
FIG. 8 depicts a visual representation of a private database query protocol according to various example embodiments of the present invention.

FIG. 8 depicts a visual representation of the PDQ protocol according to various example embodiments of the present invention. It is assumed that the client has an SQL code that requests $a_j$. k such that $\alpha_j$, $v < \delta$ for $i \in [n]$ and $\in P$. This translates to the following PDQ protocol: Given an encrypted database $\overline{\mathcal{D}} = \{\overline{\alpha} = (\overline{a.v}, \alpha, k)\}$ and an encrypted constant $\overline{\theta} = \text{Enc}(\theta)$, $$\text{select } \overline{\alpha.v} \text{ from } \overline{\mathcal{D}} \text{ where } \overline{\alpha.k} < \overline{\theta}. \qquad \text{(Equation 18)}$$

In relation to correctness, the correctness of the protocol follows easily from the correctness of $LT_{\{0,1\}^\ell}$: if the condition is satisfied for some $\alpha_j$. k, then $\overline{\beta_j}$ is an encryption of 1 and $\overline{\gamma_j} = \overline{\alpha_j.v \cdot \beta_j} = \overline{\alpha_j.v}$.

In relation to security, the security of the protocol is based on the semantic security of the underlying FHE scheme. By definition, semantic security means that no adversary without knowledge of the secret key can distinguish between encryption of two messages of the same length. Therefore, with inputs, intermediate results and outputs of the protocol being encrypted by a semantically secure FHE schemes, no one other than the client will be able to infer additional information from just transcripts of the protocol execution.

Experiments

Various experimental results on the efficiency of the method of determining an order of encrypted inputs (the comparison algorithm as shown in FIG. 6A for OEPS (One Element per Slot) and in FIG. 7 for TBPS (Two Bits per Slot), where each B is a two-bit block) according to various example embodiments (which may be referred to herein as the "present example method" for ease of reference) will now be discussed. The experiment platform is an Intel® Xeon Platinum 8170 with maximum turbo frequency of 3.7 GHz and 192 GB RAM. The algorithms are implemented with GMP 6.1.2 (e.g., see Granlund et al., "GNU MP: The GNU Multiple Precision Arithmetic Library" Version 6.1.2, 2017), NTL 11.2.0 (e.g., see Shoup, "NTL: A library for doing number theory", Version 10.5.0) and HElib (Commit f905e95) (Halevi et al., "HElib: Software library for homomorphic encryption", 2013). The security level of the chosen parameters was evaluated with the LWE estimator by Albrecht et al. (e.g., see Albrecht et al., "On the concrete hardness of learning with errors", J. Mathematical Cryptology, 9(3), 2015), factoring in improved attacks on FHE instances by Albrecht (e.g., see Albrecht, "On dual lattice attacks against small-secret LWE and parameter choices in HElib and SEAL", In *EUROCRYPT* 2017, Part II, volume 10211 of *LNCS*, pages 103-129, Springer, Heidelberg, 2017).

In various experiments, the present example method was compared with the state-of-the-art Boolean circuit technique by Cheon et al. (e.g., see Cheon et al., "Search-and-compute on encrypted data", In *FC* 2015 *Workshops*, volume 8976 of *LNCS*, pages 142-159, Springer, Heidelberg, 2015). The other methods (ORE, OPE, PHE) are not considered in the experiments as they do not offer the same degree of security and composability and there is a lack of publicly available libraries implementing them. These either leak some information about the encrypted data or require multiple rounds of communication to achieve the computation. In the case of PHE-based systems, to maintain the privacy of data access patterns, we may have work with the entire database at every step which significantly increases communication costs.

With respect to FHE instances, for the experiments, the following parameters were used:

To obtain the results in Tables 1, 2 (presented below), m=10261, L=11 which yields a plaintext space of $\mathbb{F}_{2^{30}}$ with 330 slots and at least 80 bit security.

To obtain the results in Table 3 (presented below), m=10897, L=11 which yields a plaintext space of $\mathbb{F}_{2^{64}}$ with 160 slots and at least 80 bit security.

Figure 9A:
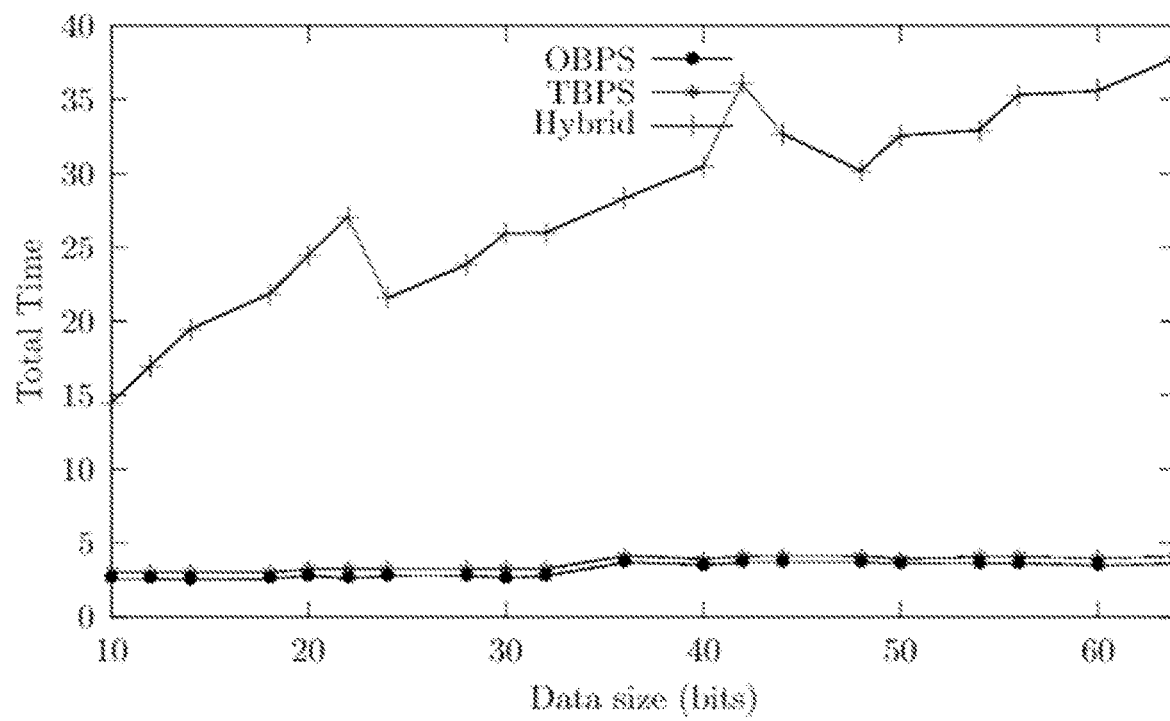
FIGS. 9A and 9B depict plots showing a performance comparison between an example method according to various example embodiments of the present invention and a state-of-the-art optimized Boolean circuit method.
Figure 9B:
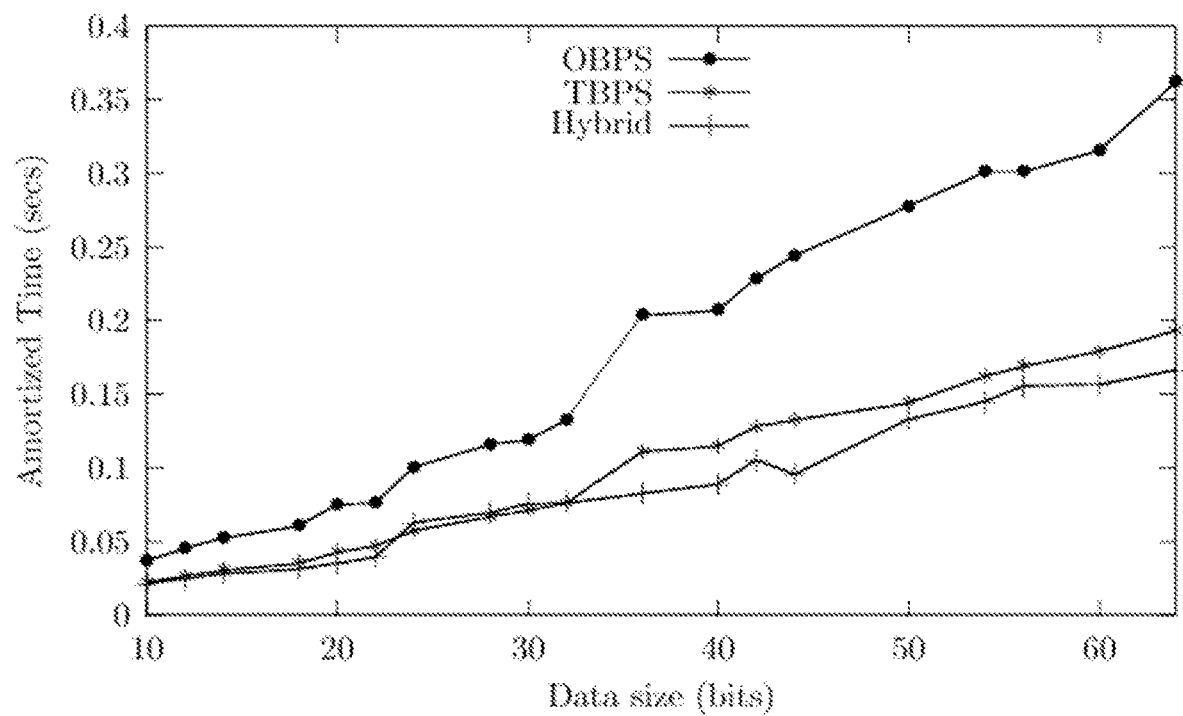

To obtain the results in FIGS. 9A and 9B, m=15709 with L=11, 13 (depending on requirements) were used. This yielded a plaintext space of $\mathbb{F}_{2^{22}}$ with 682 slots and at least 80 bit security.

In various example embodiments, a block size of 2 was used for $LT_{\{0,1\}^\ell}$ as it was determined to be the most effective size. For example, larger block sizes were found to suffer from expensive block-wise computations that were not offset with sufficient reductions during extraction.

Various results of the above-mentioned experiments are presented below.

TABLE 1

Experimental Results for State-of-the-Art
Optimized Boolean Circuit Method

| Data Size (bits) | # Packed | Total Time (sec) | Amort. Time (sec) |
|---|---|---|---|
| 10 | 33 | 1.58 | 0.048 |
| 14 | 23 | 1.58 | 0.069 |
| 18 | 18 | 1.72 | 0.096 |
| 22 | 15 | 1.72 | 0.114 |
| 26 | 12 | 1.72 | 0.143 |
| 30 | 11 | 1.72 | 0.156 |

TABLE 2

Experimental Results (Time and Space Efficiency)
for the Present Example Method

| | | Two Bits per Slot (TBPS) | | One Element per Slot (OEPS) | | |
|---|---|---|---|---|---|---|
| Data Size(bits) | # Packed | Total Time (sec) | Amort. Time (sec) | # Packed | Total Time (sec) | Amort. Time (sec) |
| 10 | 66 | 1.88 | 0.029 | 330 | 10.34 | 0.031 |
| 14 | 47 | 1.89 | 0.040 | 330 | 13.78 | 0.042 |
| 18 | 36 | 1.98 | 0.055 | 330 | 17.16 | 0.052 |
| 22 | 30 | 1.98 | 0.066 | 330 | 20.61 | 0.062 |
| 26 | 25 | 1.98 | 0.079 | 330 | 24.02 | 0.073 |
| 30 | 22 | 1.99 | 0.090 | 330 | 28.34 | 0.086 |

TABLE 3

Table of OEPS Performance for Data Sizes from 32 to 64 bits

| Data Size (bits) | # Packed | Total Time (sec) | Amort. Time (sec) |
|---|---|---|---|
| 32 | 160 | 41.525 | 0.2595 |
| 40 | 160 | 51.443 | 0.3215 |
| 48 | 160 | 71.137 | 0.3852 |
| 56 | 160 | 71.137 | 0.4446 |
| 64 | 160 | 81.301 | 0.5081 |

It can be observed from Table 2 that the present example method outperforms the optimized Boolean circuit evaluation method (Table 1) for all the data sizes considered. Particularly, the present example method allows almost two comparisons to be performed for every one compared using Boolean circuits. In addition, the present example method is able to pack at least 10 times more elements into a single ciphertext compared to the state-of-the-art, which only increases as input data size grows.

In various example embodiments, instead of packing all the bits into a single slot, just slightly more is packed. This allows more data to be stored in a single ciphertext without requiring too much more time to compute comparisons. For example, Table 2 illustrates the performance of such an approach. Although it is not as good as packing one element per slot, with about 0.02 sec slower in amortized time, its performance is very close and in return, it is not necessary to wait much longer time to recover results. The overhead incurred in this case is merely on average about 0.15 secs, which is only 10% of the current state-of-the-art.

To analyze the performance for larger input sizes of up to 64 bits, another experiment was conducted, and the results are shown in Table 3. The trend in the efficiency is as expected, with comparisons on 64-bit data taking almost twice as long as 32-bit data. Performance suffers for inputs on the lower end as a much larger field was used to accommodate up to 64-bits. However, when compared to the results in Table 2, there is a much larger gap that comes from having fewer slots and more expensive computations to derive the result. This means that the OEPS approach does not scale well into large data sizes as well.

Finally, an experiment was performed testing the present example method (i.e., the hybrid approach illustrated in FIG. 7), where a moderate degree extension was used and encoded data into blocks of moderate size (e.g., 10-22 bits). Fixing the FHE instance and comparing the present example with the optimized circuits (state-of-the-art optimized Boolean circuit method), various results are presented in FIGS. 9A and 9B. In particular, FIGS. 9A and 9B depict plots showing the performance comparison between the present example method and the optimized circuits. It is clear that although the total time taken to obtain the comparison results is up to 10 times higher, better amortized results were achieved in virtually every data size up to 64-bits. These outperform both the element-based comparison algorithm for larger data and slot-based techniques in all ranges. In general, the total time required to compute the result is more than two times faster with the hybrid approach with over three times improvement in amortized time. Furthermore, the gap between TBPS and the present example method seems to be widening between 32 bits and 64 suggesting better scalability.

Accordingly, various example embodiments provide a method of determining an order of encrypted inputs based on finite fields for computation on encrypted data. There is also provided a hybrid approach that scales to large bit sizes, as well as use of depth-free Frobenius maps and linear transformations on finite fields to improve efficiency compared to conventional methods. Accordingly, various example embodiments advantageously exploit depth-free Frobenius maps and linear transformations on finite fields (the extraction step described hereinbefore) to obtain an efficient method or algorithm to compare the order of two encoded integers. The method also supports large amount of simultaneous comparisons regardless of bit-size of data. In this regard, plaintexts are encoded into blocks of elements of a finite field, and multiple bits are stored per slot instead of a single bit. In various example embodiments, two bits may be stored per slot for improved performance with low overhead.

Accordingly, various example embodiments enables efficient computation on large plaintexts (e.g., up to 64-bits large), which improves the performance and capabilities of a large number of applications. Various example embodiments may be targeted at specific applications as operations are directed to (in)equality and order comparisons. For example, these operations are sufficient and necessary for database and data warehousing applications.

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A method of determining an order of encrypted inputs, including a first encrypted input and a second encrypted input, using at least one processor, the first encrypted input including a first encrypted data and the second encrypted input including a second encrypted data, each of the first and second encrypted data being encrypted based on a homomorphic encryption scheme, the method comprising:

extracting a first series of encrypted blocks from the first encrypted data and a second series of encrypted blocks from the second encrypted data;

performing a first block-wise operation between the first series of encrypted blocks and the second series of encrypted blocks to obtain a first series of block-wise outputs;

performing a second block-wise operation between the first series of encrypted blocks and the second series of encrypted blocks to obtain a second series of block-wise outputs; and determining an order of the first and second encrypted data based on the first series of block-wise outputs and the second series of block-wise outputs;

wherein said extracting a first series of encrypted blocks comprises generating each encrypted block in the first series of encrypted blocks as an encrypted element of a finite field, said extracting a second series of encrypted blocks comprises generating each encrypted block in the second series of encrypted blocks as an encrypted element of the finite field, and the first encrypted data and the second encrypted data are each a single encrypted element of the finite field, and wherein each encrypted block in the first series of encrypted blocks comprises between 10-22 bits, and each encrypted block in the second series of encrypted blocks comprises between 10-22 bits, and wherein the method further comprises, evaluating, using one or more depth-free Frobenius maps, each encrypted block in the first series of encrypted blocks and each encrypted block in the second series of encrypted blocks.

2. The method according to claim 1, wherein
the first encrypted data comprises a third series of encrypted blocks, each encrypted block thereof being a single encrypted element of the finite field, and
the second encrypted data comprises a fourth series of encrypted blocks, each encrypted block thereof being a single encrypted element of the finite field.

3. The method according to claim 2, wherein
said extracting a first series of encrypted blocks comprises generating a plurality of first series of encrypted blocks from the first encrypted data, each first series of encrypted blocks thereof being generated from a corresponding encrypted block in the third series of encrypted blocks of the first encrypted data and each encrypted block of each first series of encrypted blocks thereof being an encrypted element of the finite field,
said extracting a second series of encrypted blocks comprises generating a plurality of second series of encrypted blocks from the second encrypted data, each second series of encrypted blocks thereof being generated from a corresponding encrypted block in the fourth series of encrypted blocks of the second encrypted data and each encrypted block of each second series of encrypted blocks thereof being an encrypted element of the finite field,
said performing a first block-wise operation comprising performing, for each of the plurality of first series of encrypted blocks, the first block-wise operation between the first series of encrypted blocks and the corresponding series of encrypted blocks of the plurality of second series of encrypted blocks to obtain a corresponding first series of block-wise outputs, and
said performing a second block-wise operation comprising performing, for each of the plurality of first series of encrypted blocks, the second block-wise operation between the first series of encrypted blocks and the corresponding series of encrypted blocks of the plurality of second series of encrypted blocks to obtain a corresponding second series of block-wise outputs.

4. The method according to claim 1, wherein the first series of encrypted blocks corresponds to a vector space representation of the first encrypted data with respect to the finite field, and the second series of encrypted blocks corresponds to a vector space representation of the second encrypted data with respect to the finite field.

5. The method according to claim 1, wherein
the first block-wise operation is based on a less-than or greater-than block-wise comparison operation, and
the second block-wise operation is based on an equality block-wise comparison operation.

6. The method according to claim 1, wherein said determining the order of the first and second encrypted data comprises performing, for each block-wise output of the second series of block-wise outputs from a second block-wise output to a penultimate block-wise output, a multiplication of the block-wise output and each block-wise output subsequent to the block-wise output to produce a first series of intermediate results.

7. The method according to claim 6, wherein said determining the order of the first and second encrypted data further comprises performing, for each block-wise output of the first series of block-wise outputs, a multiplication of the block-wise output with the intermediate result of the first series of intermediate results corresponding to the block-wise output, to produce a second series of intermediate results.

8. The method according to claim 7, wherein said determining the order of the first and second encrypted data further comprises:
combining the second series of intermediate results to obtain a combined result; and
determining the order of the first and second encrypted data based on the combined result.

9. The method according to claim 1, wherein the first encrypted data and the second encrypted data are each a single encrypted element of a finite extension field.

10. A system for determining an order of encrypted inputs, including a first encrypted input and a second encrypted input, the first encrypted input including a first encrypted data and the second encrypted input including a second encrypted data, each of the first and second encrypted data being encrypted based on a homomorphic encryption scheme, the system comprising:
a memory; and
at least one processor communicatively coupled to the memory and configured to:
extract a first series of encrypted blocks from the first encrypted data and a second series of encrypted blocks from the second encrypted data;
perform a first block-wise operation between the first series of encrypted blocks and the second series of encrypted blocks to obtain a first series of block-wise outputs;
perform a second block-wise operation between the first series of encrypted blocks and the second series of encrypted blocks to obtain a second series of block-wise outputs; and
determine an order of the first and second encrypted data based on the first series of block-wise outputs and the second series of block-wise outputs;
wherein said extract a first series of encrypted blocks comprises generating each encrypted block in the first series of encrypted blocks as an encrypted element of a finite field, said extract a second series of encrypted blocks comprises generating each encrypted block in the second series of encrypted blocks as an encrypted element of the finite field, and the first encrypted data and the second encrypted data are each a single encrypted element of the finite field, and wherein each encrypted block in the first series of encrypted blocks comprises between 10-22 bits, and each encrypted block in the second series of encrypted blocks comprises between 10-22 bits, and wherein the at least one processor is configured to evaluate, using one or more depth-free Frobenius maps, each encrypted block in the first series of encrypted blocks and each encrypted block in the second series of encrypted blocks.

11. The system according to claim 10, wherein
the first encrypted data comprises a third series of encrypted blocks, each encrypted block thereof being a single encrypted element of the finite field, and
the second encrypted data comprises a fourth series of encrypted blocks, each encrypted block thereof being a single encrypted element of the finite field.

12. The system according to claim 11, wherein
said extract a first series of encrypted blocks comprises generating a plurality of first series of encrypted blocks from the first encrypted data, each first series of encrypted blocks thereof being generated from a corresponding encrypted block in the third series of encrypted blocks of the first encrypted blocks and each encrypted block of each first series of encrypted blocks thereof being an encrypted element of the finite field, said extract a second series of encrypted blocks comprises generating a plurality of second series of encrypted blocks from the second encrypted data, each second series of encrypted blocks thereof being generated from a corresponding encrypted block in the fourth series of encrypted blocks of the second encrypted blocks and each encrypted block of each second series of encrypted blocks thereof being an encrypted element of the finite field, said perform a first block-wise operation comprising performing, for each of the plurality of first series of encrypted blocks, the first block-wise operation between the first series of encrypted blocks and the corresponding series of encrypted blocks of the plurality of second series of encrypted blocks to obtain a corresponding first series of block-wise outputs, and said perform a second block-wise operation comprising performing, for each of the plurality of first series of encrypted blocks, the second block-wise operation between the first series of encrypted blocks and the corresponding series of encrypted blocks of the plurality of second series of encrypted blocks to obtain a corresponding second series of block-wise outputs.

13. The system according to claim 10, wherein
the first block-wise operation is based on a less-than or greater-than block-wise comparison operation, and
the second block-wise operation is based on an equality block-wise comparison operation.

14. The system according to claim 10, wherein said determine the order of the first and second encrypted data comprises performing, for each block-wise output of the second series of block-wise outputs from a second block-wise output to a penultimate block-wise output, a multiplication of the block-wise output and each block-wise output subsequent to the block-wise output to produce a first series of intermediate results.

15. The system according to claim 14, wherein said determine the order of the first and second encrypted data further comprises performing, for each block-wise output of the first series of block-wise outputs, a multiplication of the block-wise output with the intermediate result of the first series of intermediate results corresponding to the block-wise output, to produce a second series of intermediate results.

16. The system according to claim 15, wherein said determine the order of the first and second encrypted data further comprises:

combining the second series of intermediate results to obtain a combined result; and
determining the order of the first and second encrypted data based on the combined result.

17. The system according to claim 10, wherein the first encrypted data and the second encrypted data are each a single encrypted element of a finite extension field.

18. A computer program product, embodied in one or more non-transitory computer-readable storage mediums, comprising instructions executable by at least one processor to perform a method of determining an order of encrypted inputs, including a first encrypted input and a second encrypted input, the first encrypted input including a first encrypted data and the second encrypted input including a second encrypted data, each of the first and second encrypted data being encrypted based on a homomorphic encryption scheme, the method comprising:

extracting a first series of encrypted blocks from the first encrypted data and a second series of encrypted blocks from the second encrypted data;
performing a first block-wise operation between the first series of encrypted blocks and the second series of encrypted blocks to obtain a first series of block-wise outputs;
performing a second block-wise operation between the first series of encrypted blocks and the second series of encrypted blocks to obtain a second series of block-wise outputs; and determining an order of the first and second encrypted data based on the first series of block-wise outputs and the second series of block-wise outputs;
wherein said extracting a first series of encrypted blocks comprises generating each encrypted block in the first series of encrypted blocks as an encrypted element of a finite field, said extracting a second series of encrypted blocks comprises generating each encrypted block in the second series of encrypted blocks as an encrypted element of the finite field, and the first encrypted data and the second encrypted data are each a single encrypted element of the finite field, wherein each encrypted block in the first series of encrypted blocks comprises between 10-22 bits, and each encrypted block in the second series of encrypted blocks comprises between 10-22 bits, and wherein the method further comprises, evaluating, using one or more depth-free Frobenius maps, each encrypted block in the first series of encrypted blocks and each encrypted block in the second series of encrypted blocks.

* * * * *